United States Patent [19]

Crook et al.

[11] Patent Number: 5,255,375
[45] Date of Patent: Oct. 19, 1993

[54] HIGH PERFORMANCE INTERFACE BETWEEN AN ASYNCHRONOUS BUS AND ONE OR MORE PROCESSORS OR THE LIKE

[75] Inventors: Neal A. Crook, Reading; Paul L. Bruce, Basingstoke; Robert J. Galuszka, Reading, all of England

[73] Assignee: Digital Equipment Corporation, Maynard, Mass.

[21] Appl. No.: 819,389

[22] Filed: Jan. 10, 1992

[51] Int. Cl.⁵ .......................................... G06F 13/14
[52] U.S. Cl. ................. 395/325; 364/270.5; 364/DIG. 1; 364/950.1; 364/942.4; 364/DIG. 2
[58] Field of Search .............. 395/325, 725; 364/270.5, DIG. 1, 950.1, 942.4, DIG. 2; 340/825.5

[56] References Cited

U.S. PATENT DOCUMENTS

| | | | |
|---|---|---|---|
| 4,390,969 | 6/1983 | Hayes | 395/550 |
| 4,547,849 | 10/1985 | Louie et al. | 395/325 |
| 4,779,089 | 10/1988 | Theus | 340/825.5 |
| 5,070,443 | 12/1991 | Priem et al. | 395/725 |
| 5,079,696 | 1/1992 | Priem et al. | 395/500 |

Primary Examiner—Allen R. MacDonald
Assistant Examiner—Glenn A. Auve
Attorney, Agent, or Firm—Kenyon & Kenyon

[57] ABSTRACT

A bus interface coupling one or more processors to a standardized bus, such as the Futurebus. The bus interface controls the assertion of all address and data handshaking signals on the bus while sending control signals to address/data transceivers coupled in between the bus and the processors. The interface comprises a plurality of synchronous state machines coupled to the processors for passing status and command data to a plurality of master and slave devices coupled to the bus. The interface also comprises a plurality of asynchronous state machines coupled between the synchronous state machines and the bus. The asynchronous machines quickly detect and assert the necessary handshaking signals of the bus protocol. The interface also controls the address/data transceivers coupled between the processors and the bus and provides an efficient throughput of data to and from the bus. Items coupled to the bus interface can operate either as slave or master devices. The bus interface handles the complex asynchronous interface with the bus and provides a much easier synchronous interface with the master and slave devices coupled to the bus.

21 Claims, 26 Drawing Sheets

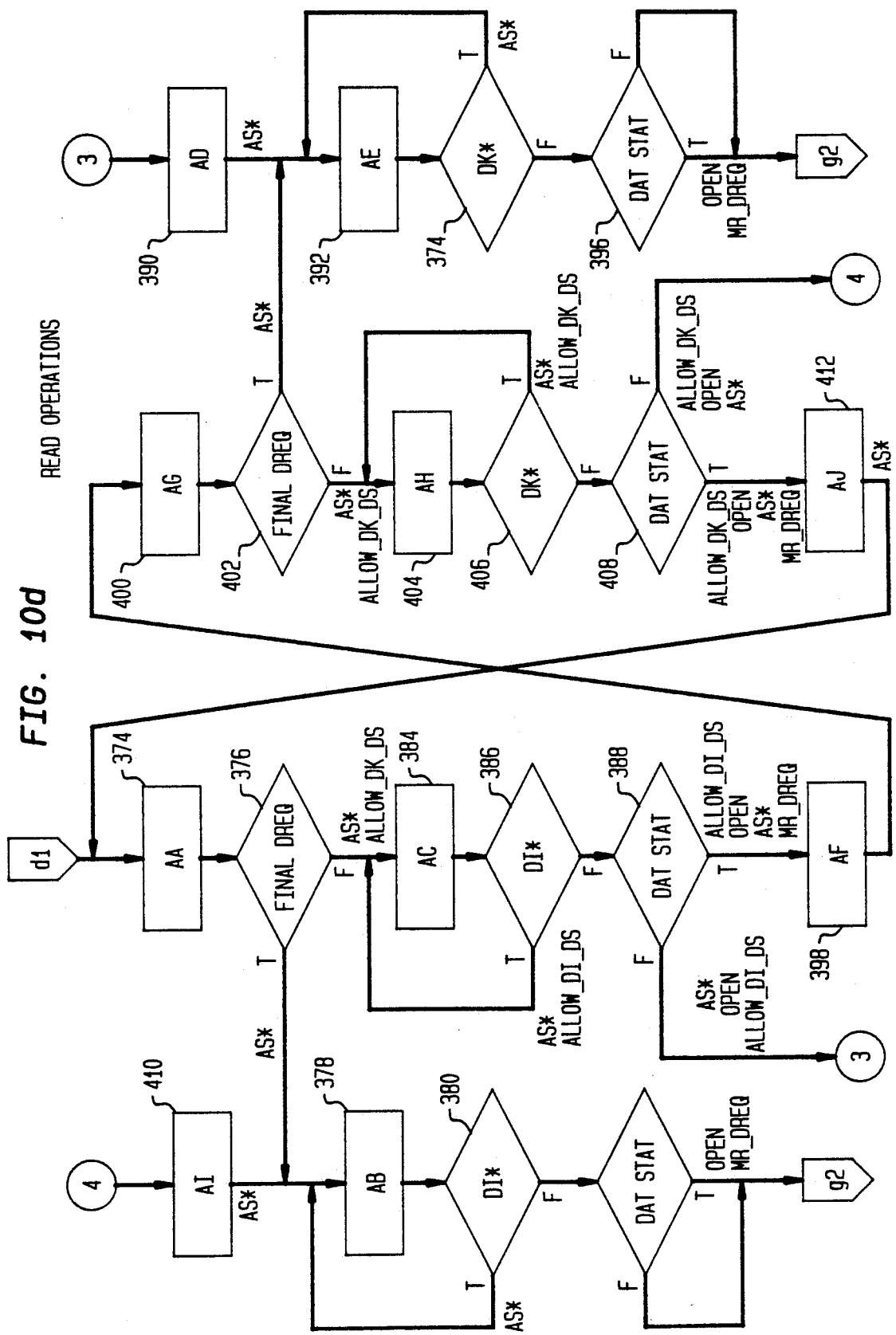

HIGH PERFORMANCE INTERFACE BETWEEN AN ASYNCHRONOUS BUS AND ONE OR MORE PROCESSORS OR THE LIKE

FIELD OF THE INVENTION

The present invention is directed to an interface between one or more processors and an asynchronous bus, and more particularly to a bus interface that performs all bus control and handshaking functions while controlling the transfer of data and address information between processors and the bus.

BACKGROUND OF THE INVENTION

In a computer system, a plurality of devices such as computer processors, memories, communication devices, etc. are typically coupled together via a common bus. As more devices are added to the bus, the efficiency of the entire system depends on the speed at which transactions between devices take place on the bus. A typical series of bus transactions occurs between a master processing device and a slave memory device. In this series of transactions, the master will transmit a request, via the bus, to all of the other devices coupled to the bus. It is up to the slave to determine whether or not it has been selected by the master. The selected slave will then send an acknowledgement to the master, thus establishing communication between the two devices.

Next, data is transferred between the master and slave according to the original request. Finally, the master terminates the transaction with the slave and releases the bus.

A short turnaround time delay between the master's request and the slave's response is important for efficient bus performance. This is achieved with a quick bus interface controller placed between the processors and the network bus. If the network bus is asynchronous, it is advantageous to make the interface side of the controller asynchronous to take full advantage of the speed afforded by the asynchronous bus. In an asynchronous bus protocol that utilizes a plurality of handshaking signals between a master and a slave to affect bus transactions, a large asynchronous or synchronous state machine may be required to detect and generate the appropriate handshaking signals. A large asynchronous state machine is often too complex to design for many computer systems. A large synchronous state machine is very slow and will not provide an acceptable turnaround speed.

There is a need for an asynchronous bus interface controller that can accommodate a plurality of handshaking signals and which operates with a quick turnaround time. There is also a need for an asynchronous bus interface controller that is easily adaptable to different devices coupled to a standardized network bus. Furthermore, there is a need for a bus interface that handles both slave and master handshaking signals on an asynchronous bus.

SUMMARY OF THE INVENTION

The present invention is directed to a bus interface device that controls all bus control and handshaking functions and all transfers of data and address information between processors and the bus. The bus interface comprises a plurality of synchronous state machines and combinatorial logic blocks to interface with the processors that are coupled to a network bus. The bus interface also includes a plurality of asynchronous state machines and combinatorial logic blocks to interface with the network bus and assert the appropriate signals.

Any of the processors coupled to the bus interface can operate as a master or a slave on the network bus. For instance, if one of these processors is required to use the network bus as a master, a request signal will be sent to a synchronous state machine that controls arbitration between all processors. Once the master is granted access to the network bus, address data is written to address/data transceivers coupled to the bus. A synchronous state machine called Master Access Control asserts the appropriate command data to the network bus. Master Access Control also enables the operation of a plurality of asynchronous state machines coupled directly to the address and data handshaking lines of the network bus and the control lines for the address/data transceivers. Because of their asynchronous nature, these state machines quickly assert the appropriate handshaking signals on the network bus. For example, on a master read operation, as soon as the data from the slave is valid on the bus, the asynchronous state machines latch the data for the master and the request for new data is immediately sent to the slave. On a master write operation, as data is written to the bus, a request for more data is sent to the processors. When the synchronous state machines detect the assertion of a handshaking signal on the network bus, it is assumed that the quick asynchronous state machine has already completed the processing that is required for that handshaking signal. Through this use of asynchronous and synchronous state machines a certain degree of pipelining is achieved in the bus interface which allows a higher data throughput.

In addition, if one of the processors coupled to the bus is accessed as a slave, a synchronous state machine called Slave Access Control controls the operation of similar asynchronous state machines for asserting address and data handshaking signals on the network bus. The Slave Access Control will also assert the appropriate status signals on the bus and determine if the command sent by the master is one that can be handled by the selected slave processor.

The bus interface of the present invention can be used for a variety of applications. The asynchronous handling of the handshaking signals with the asynchronous bus allows a variety of processors to be coupled to the bus having a wide range of processing speeds.

BRIEF DESCRIPTION OF THE DRAWING

FIGS. 10a-g are the flow diagrams for the Master Access Control synchronous state machine.

DETAILED DESCRIPTION

Figure 1:
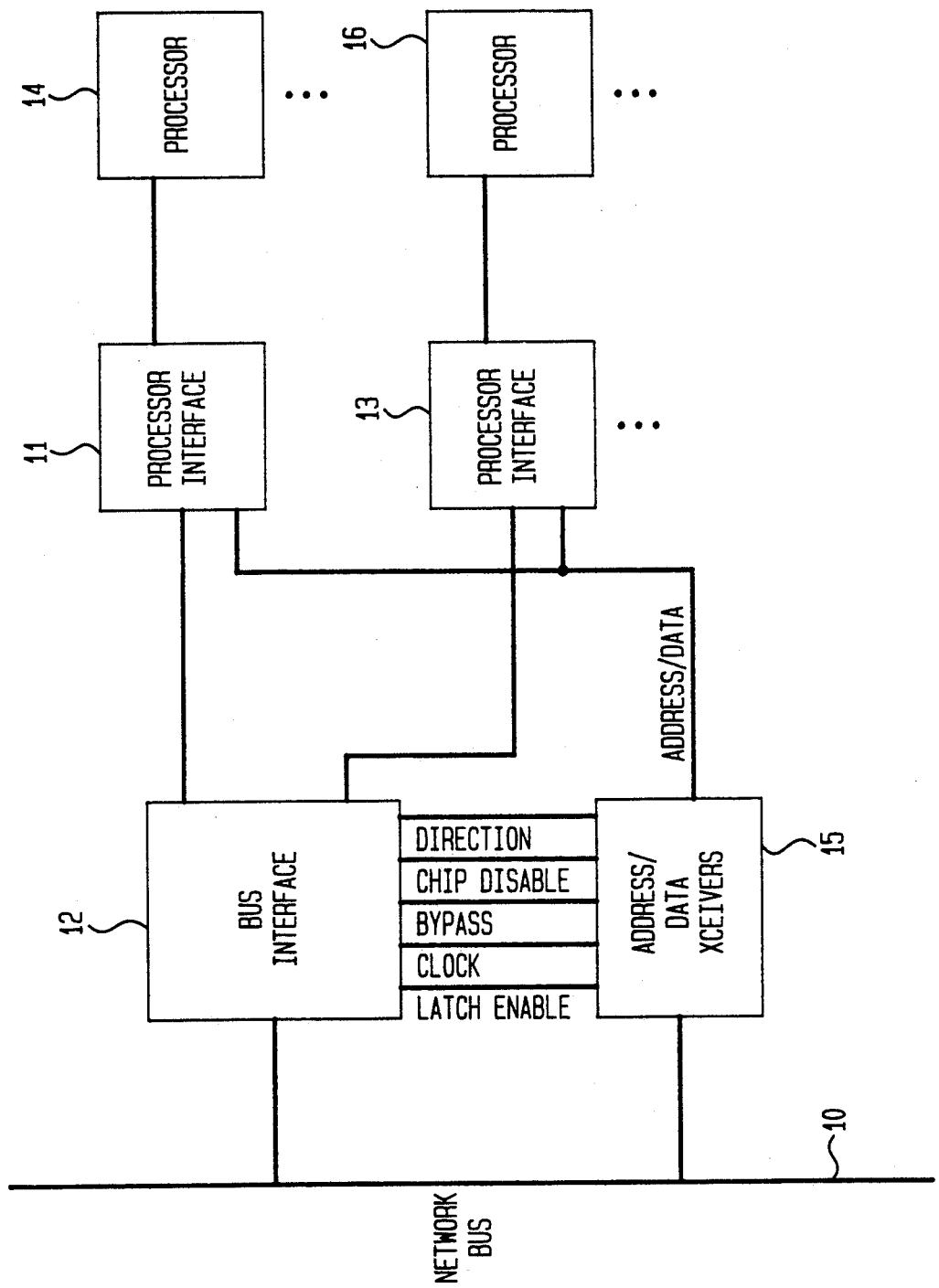
FIG. 1 is a block diagram of a computer system which incorporates the bus interface of the present invention.

Referring to FIG. 1, a block diagram of a computer system incorporating the bus interface of the present invention is shown. The network bus 10 can be implemented according to the Futurebus protocol promulgated by the IEEE (ANSI/IEEE Std. 896.1). The bus 10, which operates asynchronously, is coupled directly to a bus interface 12, which in turn is coupled to one or more processors. Several processors can be coupled to the bus interface 12. In this embodiment, there are two processors 14 and 16 coupled to respective processor interfaces 11 and 13 which, in turn, are coupled to the bus interface 12. The processor interfaces 11 and 13 are buffering devices that transmit and receive bus control signals and address and data information for the processors 14 and 16. Address/data transceivers 15 are coupled to the address and data lines of the processor interfaces 11 and 13 and the bus 10. The bus interface 12 controls the flow of address and data information through the address/data transceivers 15. The bus interface 12 is quite versatile in that the processors 14 and 16 can operate according to either a master or slave convention. For example, in a slave operation, one of the processors 14 or 16 would recognize its designated address appearing at the address/data transceivers 15. Then, data to be read from or written to the slave processor 14 or 16 would flow through the address/data transceivers 15 while the bus interface 12 controls the operation of the transceivers 15.

Figure 2:
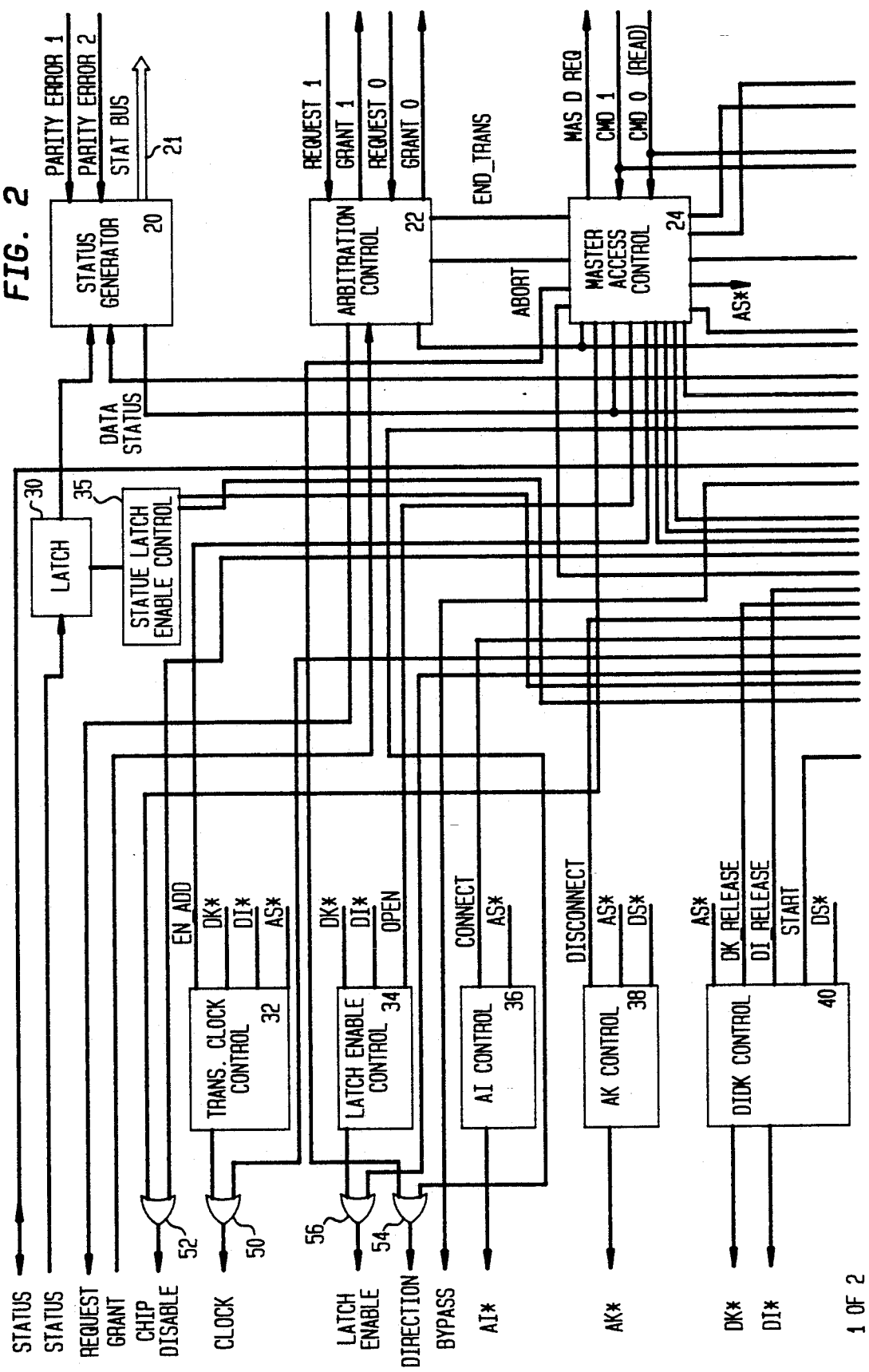
FIG. 2 is a block diagram of the bus interface constructed according to an embodiment of the present invention.
Figure 2:
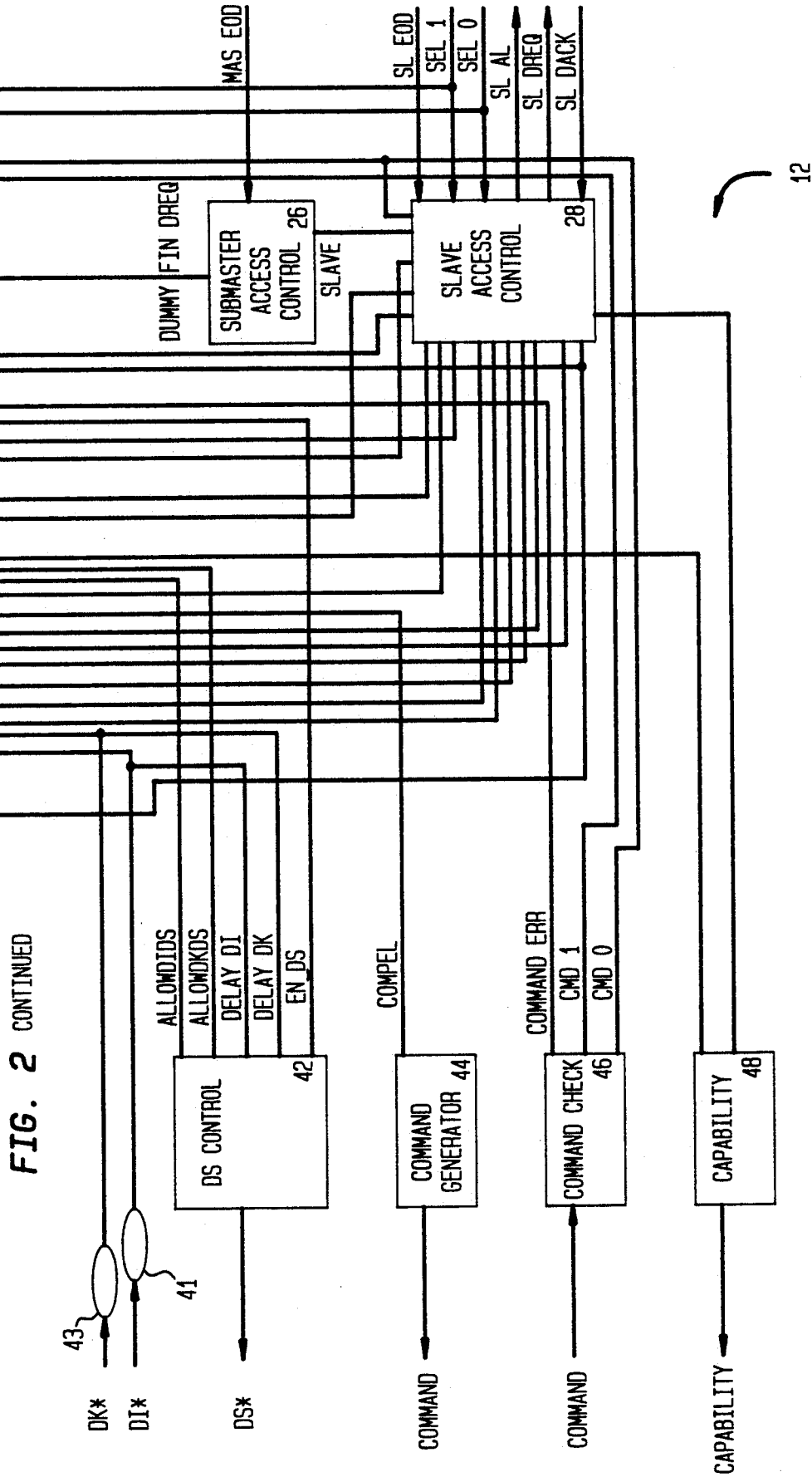

Referring to FIG. 2, a block diagram of the bus interface 12 of the present invention is shown. The bus interface 12 includes a logic circuit (Status Generator) 20 and several synchronous state machines (Arbitration Control) 22, (Master Access Control) 24, (Submaster Access Control) 26 and (Slave Access Control) 28 coupled to the processor interfaces 11 and 13 (See FIG. 1). Though the bus 10 (FIG. 1) operates asynchronously, synchronous state machines are used to interface between the bus interface 12 and the processors 14 and 16 in order to contain the complexity of this interface and results in a reduction of required interface pins. These synchronous machines 22, 24, 26, and 28 perform high level control of the address/data transceivers 15 and signal assertions on the bus 10.

The Status Generator 20 includes combinatorial logic for processing and generating status signals between the bus 10, bus interface 12, and processors 14 and 16. Each processor sends status information to the Status Generator 20 via lines Parity Error 1 and Parity Error 2. Status Generator 20 is also coupled to a latch 30, which in turn is coupled to the status lines of the bus 10. Generally, the status lines are controlled by a slave device and are used to indicate transaction error, end-of-data, and the like to the master device. Status Generator 20 receives the status signals from the latch 30 as well as internal errors generated within the bus interface 12. For instance, the Status Generator 20 is coupled to a logic circuit (Command Check) 46, which in turn is coupled to the command and command parity lines of the bus 10. Command Check 46 also includes combinatorial logic and generates two signals indicating slave command errors. After decoding and prioritizing all error signals, Status Generator 20 generates a series of signals (e.g., four) which are sent to both processors 14 and 16 on a status bus 21. A Data Status Signal is generated, which indicates whether the Status Generator 20 has seen an error, and is sent to the Master Access Control 24 and Slave Access Control 28 (described below). This signal is used to determine whether to continue or abort the present transaction on the bus 10.

Arbitration Control 22 is a synchronous state machine that is coupled between the processors 14 and 16 and a central arbiter (not shown). When a processor 14 or 16 seeks to access the bus 10, an individual request signal (Réquest 0 and Request 1) is sent to the Arbitration Control 22. Arbitration Control 22 generates a Request signal whenever it receives one from either of the processors 14 or 16. If both Request 0 and Request 1 are received, Arbitration Control 22 will arbitrate between the two signals by selecting one of the processors. The Request signal is received by a central arbiter (not shown), which is coupled to additional processors on the bus 10. The central arbiter arbitrates control of the bus between several different processors and bus interfaces. An example of such a device can be found in co-pending application Ser. No. 07/819,187, entitled QUEUE BASED ARBITER WITH MULTIPLE PRIORITY CAPABILITIES, filed on even date herewith. Upon receiving a Grant signal from the central arbiter, Arbitration Control sends a grant signal (Grant 0 or Grant 1) to the appropriate processor 14 or 16. A Start signal is sent to the Master Access Control 24, Slave Access Control 28, and DIDK Control 40 (described below) after receipt of the Grant signal from the central arbiter.

Master Access Control 24 is a synchronous state machine that basically handles master transactions on the bus 10. The signals Command 0 and Command 1 are used by both of the processors 14 and 16 to select a data width for transfer between the processors 14 and 16 and the bus 10 and to select either a read or a write operation. In this embodiment, the width of data transfers can be either 32 or 64 bits as selected by the Command 1 signal. When one of the processors 14 or 16 is operating as a master, the Command 0 signal (which is also called Read) indicates whether a read or write operation is to be performed. The Master Data Request signal indicates to a processor operating as a master device to take data from or supply data to the data transceivers 15. The Abort signal indicates to the Arbitration Control 22 that an error has been detected in the previous transaction and that the master processor 14 or 16 should relinquish the bus 10. The End_Trans signal indicates to the Arbitration Control 22 that the previous transaction has been completed without error, and additional transactions are allowed on the bus.

Submaster Access Control 26 is a separate synchronous state machine that works with Master Access Control 24. Submaster Access Control 26 counts down beats to go based on whether a write or read operation is performed and whether a master or slave operation is being performed. The Submaster Access Control 26 begins counting down beats following the receipt of a Master End-Of-Data signal from the Master Access Control 24. The Submaster Access Control 26 sends a Final Data Request signal to the Master Access Control 24 after it has finished counting down the beats. By separating the master control into two state machines, the complexity of Master Access Control 24 is greatly reduced making both state machines run more efficiently.

The Slave Access Control 28 is the final synchronous state machine in the bus interface 12. When one of the processors 14 or 16 is running as a slave, the Slave Access Control 28 handles slave transactions on the bus 10. Each of the processor interfaces 11 and 13 is coupled to a respective select line (Select 0 and Select 1) for initiating a master or slave operation. In a slave operation, the Select signals indicate that the address appearing on the bus 10 corresponds to a respective processor 14 or 16. Also in a slave operation, the Read signal, indicating whether the transaction is a read or write operation, is controlled by the Command Check 46 (described below). The master processor indicates the type of transaction to be performed (i.e., write or read) via the command signals on the bus 10. As a slave, the processors 14 and 16 will assert a Slave End-Of-Data signal to indicate that no more data is to be accessed. The Slave Access Control 28 and the processors 14 and 16 exchange Slave Data Request and Slave Data Acknowledge signals which are necessary for data read and write requests. Also, there is a Slave Address Latch signal which indicates to the processors 14 and 16 that the status information on the bus 10 is valid and that one of the processors 14 or 16 has been selected as a slave. During a local access (where one of the processors is a master and the other is a slave), the Slave Access Control 28 asserts a Dummy signal to the Master Access Control 24 to indicate that no further Slave Data Acknowledge signals will be generated by the slave processor 14 or 16. Finally, the Slave Access Control 28 can assert and receive status signals directly from the bus 10. In this embodiment of the invention, a slave processor 14 or 16 will assert status signals on the bus 10 synchronously while they are received asynchronously in the appropriate phase of a transaction.

Master Access Control 24 and Slave Access Control 28 control a series of asynchronous state machines and logic blocks that assert the appropriate transaction signals on the bus 10 and control signals for the address-/data transceivers 15. In this embodiment, a bus transaction in the Futurebus protocol comprises three phases, as follows:

1) a connection phase: the bus master selects and establishes a connection to a desired slave;

2) a data transfer phase: where data are interchanged between the master and the connected slave; and 3) a disconnection phase: where the master terminates the transaction and disconnects from the slave.

The Futurebus protocol provides for asynchronous handshaking during each bus transaction for high speed synchronization between a master and slave during the transmission of address information and data over the bus 10. The handshaking occurs over control lines of the bus 10 and includes three address handshake signals and three data handshake signals for data valid and acknowledge indications during address and data transfers, as follows:

address handshake

ADDRESS SYNC (AS*) is a synchronization signal controlled by the master that handshakes with the following corresponding signals asserted by the slave in response to the AS* signal, the AS* signal indicates that the address information is stable on the address/data lines of the bus 10;

ADDRESS ACKNOWLEDGE (AK*) is an acknowledge signal controlled by the slave to handshake with the AS* signal asserted by the master;

ADDRESS ACKNOWLEDGE INVERSE (AI*) is an additional acknowledge signal controlled by the slave to handshake with the AS* signal asserted by the master;

data handshake

DATA SYNC (DS*) is a synchronization signal controlled by the master that handshakes with the following corresponding signals asserted by the slave in response to the DS* signal. In the case of a write, the DS* signal indicates that the data is stable on the address-/data lines of the bus 10, and in the case of a read, the DS* signal indicates that the master is requesting more data;

DATA ACKNOWLEDGE (DK*) is an acknowledge signal controlled by the slave to handshake with the DS* signal asserted by the master;

DATA ACKNOWLEDGE INVERSE (DI*) is an additional acknowledge signal controlled by the slave to handshake with the DS* signal asserted by the master.

Figure 3:
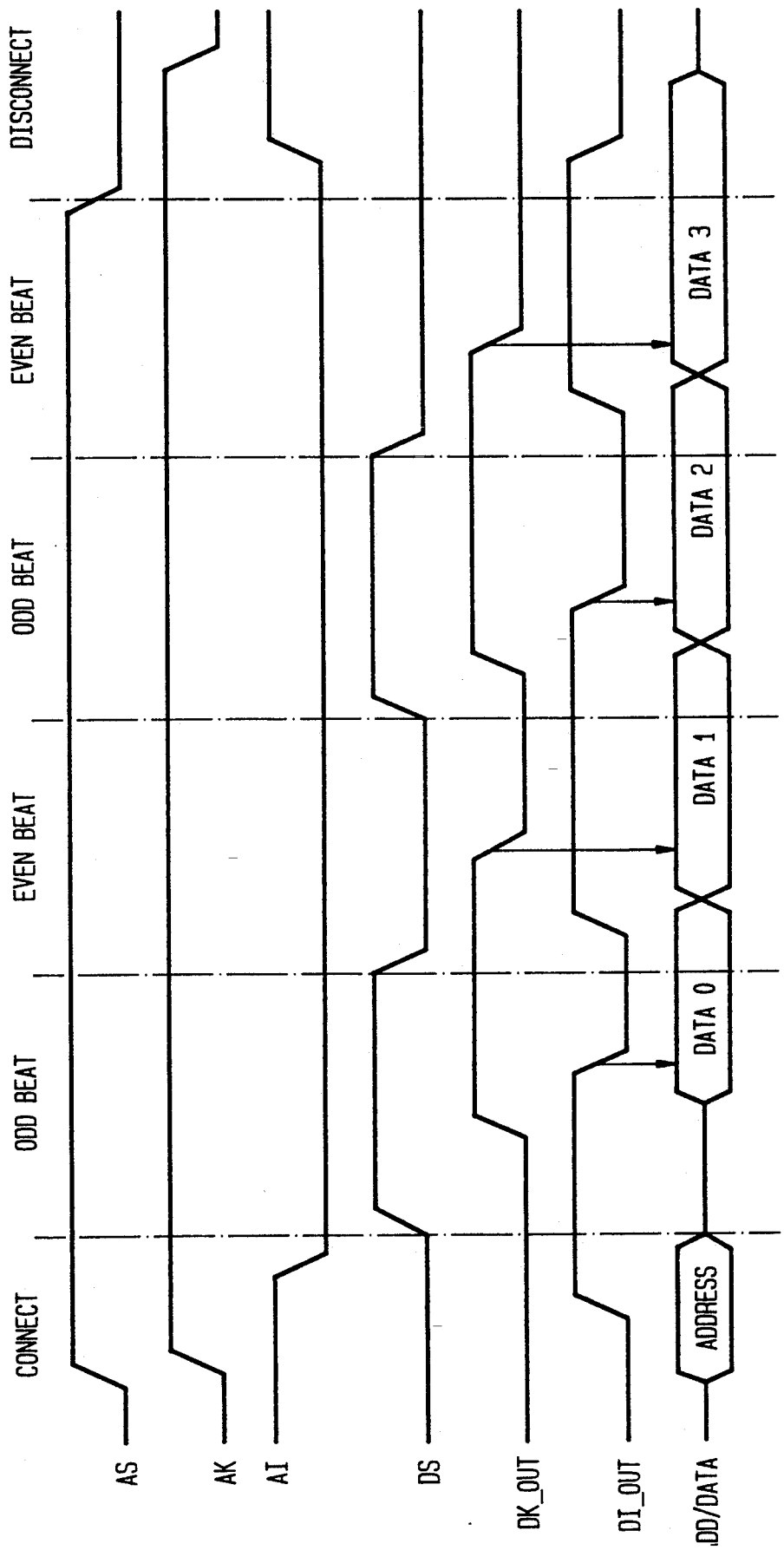
FIG. 3 is a timing diagram of the bus signals associated with a compelled read operation.

Referring to FIG. 3, a timing diagram of the aforementioned signals in a compelled read operation is shown. After one of the processors 14 and 16 has been granted access to the bus 10 and once the bus 10 has been released by the current master device, the processor (now referred to as a master) will place valid address and command data on the bus 10. The master will then indicate to the Master Access Control 24 via the Command 1 and Command 0 lines when this is completed. The AS* signal is then asserted by Master Access Control 24, which indicates to a slave processor coupled to the bus 10 that address and command data is valid on the bus and that the connection phase has begun. The selected slave processor will assert the AK* signal to acknowledge receipt of the AS* signal. Once the slave processor has placed valid status information on the bus 10, it will deassert the AI* signal.

The status information is read from the bus into the Status Generator 20, which passes this information to the master processor. If the master is executing a write operation to the slave, then the master will first write data to the data transceivers 15 which are coupled to the data lines of the bus 10. After the connection phase and at the beginning of the data transfer phase, the Master Access Control 24 will inform the DS Control asynchronous machine 42 to assert the DS* signal by asserting an EN_DS (Enable DS) signal (see FIG. 2). During the data transfer phase, the DS* signal is transitioned by the DS Control 42 depending on the DI* and DK* signal transitions and Allow_DI_DS and Allow_DK_DS signals asserted by the Master Access Control 24.

During an ODD data beat of a write data transfer, the slave asserts the DK* signal to indicate that it "sees" the DS* transition. Then, the slave deasserts a DI* signal to indicate that it has captured the write data. During the EVEN data beat, the master deasserts DS* to again indicate that valid write data is on the bus 10. When the slave sees the deassertion of DS*, it asserts DI* and again captures the write data on the bus 10. Thereafter the slave deasserts DK* to notify the master that it has captured the data. As the slave retrieves the data from the bus 10, the master prefetches the next set of data to be sent to the slave and loads it into the data transceivers 15. Two delay devices 41 and 43 become important in achieving a high throughput of data between the master and the slave. These delay devices 41 and 43 are coupled to the DI* and DK* signals off of the bus 10 and are indicated as Delay_DI and Delay_DK. The delay signals are input into the DS Control asynchronous machine 42. As will be described below, data clocking and latching are handled asynchronously. After a fixed delay, the next cycle (ODD or EVEN) may begin by transitioning DS*. Accordingly, when the deassertion of DI* (during ODD data beats) or the deassertion of DK* (during EVEN data beats) is detected synchronously, the next data beat has already begun. This process is regulated by Allow_DI_DS and Allow_DK_DS to ensure that new data is always valid.

The Master Access Controller 24, continuously requests data from the Processors 14 and 16 via the Master Data Request line, regulates the DS Control 42 which asserts and deasserts the DS* signal, and controls the releasing of data onto the bus 10 via address/data transceivers 15. When no more data is to be written to the slave by the master, the Master Access Control 24 receives a Master End-of-Data signal from the master processor. The Master Access Control 24 deasserts the AS* signal indicating the beginning of the disconnection phase.

During the disconnection phase, the slave will assert the AI* signal in response to the AS* signal, which indicates that the slave has fully received all data from the master. The slave will then deassert the AK* signal, setting up disconnection status on the bus.

During a master read operation, the same operations will occur regarding the AS*, AK*, AI*, DS*, DK*, and DI* signals. The Master Access Control 24 will control the transceiver signals so as to latch incoming data for the master processor from the slave.

When a master processor coupled to the bus 10 seeks to read data from or write data to one of the processors 14 and 16 coupled to the bus interface 12, that master processor sends an AS* signal indicating that address information is valid on the bus. The AS* signal is received at three different asynchronous controllers. The first controller to receive the AS* signal is AI Control 36 which deasserts the AI* signal. At this point, the slave processor 14 or 16 has recognized the address (sent by the master) as its own. The Slave Access Control 28 sends a Connect signal to AI Control 36 when the appropriate Select 0 or Select I signal is received from one of the processors 14 or 16. AI control deasserts the AI* signal in response to the Connect signal indicating the end of the connection phase.

The master processor will then assert the DS* signal. The second controller to receive the AS* signal is DIDK Control 40 which controls the assertion of both the DI* and DK* signals. During the data transfer phase, the DIDK Control 40 automatically asserts the appropriate DI* or DK* signal in order to save time in synchronously detecting the DS* signal and setting up a response. DI_Release and DK_Release are signals asserted by the Slave Access Control 28 indicating that data has been successfully loaded to or read from the data transceivers 15.

The third asynchronous controller to receive the AS* signal, AK Control 38 will assert the AK* signal immediately after the AS* signal is received from the master. Once all data has been read from the slave, an End-of-Data signal is received by the Slave Access Control 28 which then asserts a Disconnect signal to the AK control 38. The AK Control 38 then deasserts the AK* signal setting up disconnection status on the bus 10.

Additional logic blocks in the bus interface include Command Generator 44, Command Check 46, and Capability Control 48. Command Generator 44 operates when one of the processors 14 or 16 is acting as a master. It generates bits for the command lines of the bus 10 and a command parity bit. The Command Generator 44 receives a Compel signal from the Master Access Control 24 indicating that the operation to be performed is a compelled read or write (i.e., the slave processor is required to make a response before the master proceeds to the next transfer). The Command Generator 44 generates the necessary command signals during the connection, data transfer, and disconnection phases (e.g. write, read, block transfer, etc.).

Command Check 46 receives the command signals and command parity bit from the bus 10. Any errors detected by the Command Check 44 are reflected in the Data Status signal generated by the Status Generator 20. When one of the processors 14 or 16 is acting as a slave, the Command Check sends Command 0 and Command i signals to the Slave Access Control 24 and the processors 14 and 16 indicating whether a read or write operation is to be performed and the width of the data transfer.

Capability Control 48 receives and generates capability data for the bus 10 depending on whether or not one of the processors is operating as a master or a slave. Capability data indicates to a master whether or not the slave processor can handle a proposed data transfer. Accordingly, the Master Access Control 24 receives capability signals from Capability Control 48 and the Slave Access Control 28 sends capability data to the Capability Control 48.

Asynchronous controllers are provided for handling the control of the data transceivers 15 asynchronously, thus affording quick data transfer between a master and a slave. Transceiver Clock Control 32 controls the clocking signals for the data transceivers 15 (see FIG. 1). The clocking signals are used to clock data out to the bus 10. Transceiver Clock Control 32 receives the DI*, DK*, and AS* signals from the bus 10. As mentioned previously, transitions of the DI* and DK* signals indicate that the slave has received the previously sent data. Therefore, as soon as the appropriate DI* or DK* signal is received, new data to be written to a slave coupled to the bus can be immediately sent. The Master Access Control 24 also sends an En_Add (Enable Address) signal to the Transceiver Clock Control 32 to clock out the address data onto the bus 10. Once the address data is placed on the bus 10 and is valid, the Master Access Control 24 asserts the AS* signal, which is received by the slave devices coupled to the bus 10. The clocking output of the Transceiver Clock Control 32 is logically combined in an OR gate 50 with an output of the Slave Access Control 28. This allows the Slave Access Control 28 to assert clock signals synchronously so that the clock at the transceivers 15 is controlled during both master and slave operations.

Latch Enable Control 34 controls the assertion of the Latch Enable signal for the transceivers 15. This is used only when address or data information is being read from the bus 10. Latch Enable Control 34 receives the DI* and DK* signals from the bus as well as an Open signal from the Master Access Control 24. Again, upon seeing the appropriate DI* or DK* transition indicating that data is valid on the bus 10, the data is immediately latched allowing for the next data transfer to begin. The Master Access Control 24 sends an Open signal to enable the Latch Enable Control 34. The output of the Latch Enable Control 34 is logically combined in an OR gate 56 with an output of the Slave Access Control 28. This allows the Slave Access Control 28 to assert Latch Enable signals synchronously.

Status Latch Enable Control 35 is coupled to the latch enable input of the status latch 30. Upon receiving the appropriate delayed DI* or DK* signal, status data is valid on the bus, and the Status Latch Enable Control 35 latches this status data for the Status Generator 20.

Outputs from each of the Master Access Control 24 and the Slave Access Control 28 are coupled to an OR gate 52, which supplies a Chip Disable signal to the transceivers 15. The Chip Disable signal allows the Access Controls 24 and 28 to put the transceivers 15 into a tri-state mode of operation. Also, outputs from each of Access Controls 24 and 28 are coupled to another OR gate 54 which supplies a Direction signal for the transceivers 15. This signal is used to set the direction of movement of data through the transceivers 15 in read or write operations. Finally, a Bypass signal is generated by the Slave Access Control 28, which makes the transceivers 15 function in a transparent mode of operation. The Bypass signal is only asserted when one of the processors 14 or 16 is writing data to or reading data from another local processor 14 or 16. In such a case, the Latch Enable and Clock signals are not relevant to the transaction.

Figure 4:
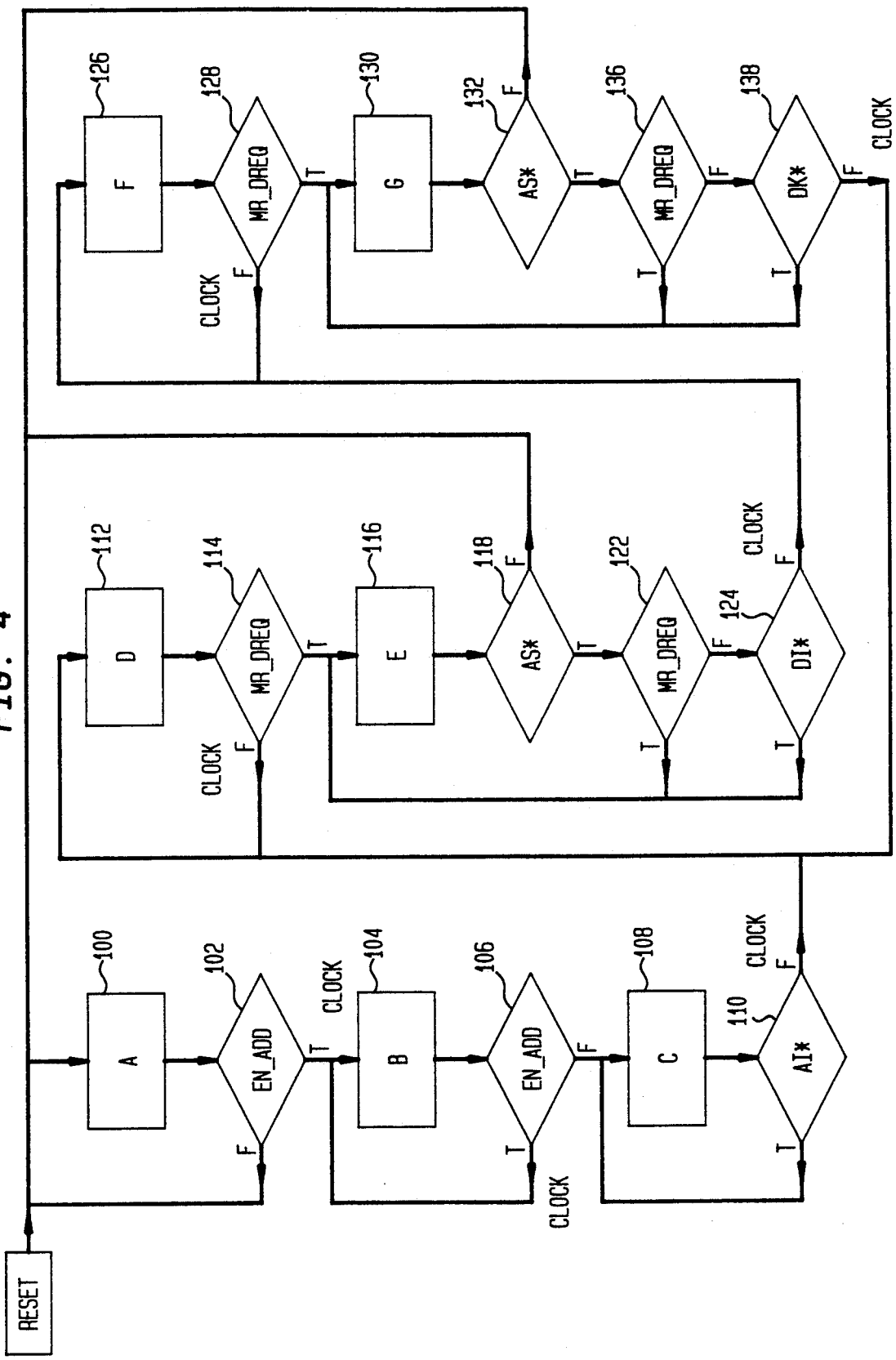
FIG. 4 is a flow diagram for the Transceiver Clock Control a synchronous state machine.

Referring to FIG. 4, the state flow diagram for the Transceiver Clock Control 32 is shown. Upon reset of the bus interface 12, the Transceiver Clock Control 32 goes into an idle state A 100. A Reset signal can be generated by one of the processors 14 or 16, by the bus interface 15, or can be received from the bus 10. In decision block 102, if the En_Add signal has been asserted by the Master Access Control 24, then a clock signal is generated and the state changes to state B 104. If the En_Add signal has not been asserted, then the state remains in the idle state A 100.

The En_Add signal serves as an enabling signal for the Transceiver Clock Control 32. Once the En_Add signal is asserted, a clock signal is generated. Once the En_Add signal is deasserted (as seen in decision block 106), the state changes to state C 108. The state remains in state C 108 until the AI* signal is deasserted in decision block 110. Once the AI* signal is deasserted, as seen from the bus, a clock signal is generated and the state changes to state D 112. The deassertion of the AI* signal indicates the start of the data transfer phase and the beginning of the ODD data beat (see FIG. 3), and data is immediately clocked out onto the bus 10. State D 112 indicates the start of the EVEN data beat of the data transfer phase. If a Master Data Request signal is not seen from the Master Access Control 24 in decision block 114, the state remains in state D 112 and the clock signal remains asserted. Master Data Request indicates a request for data by the Master Access Control 24, and once this signal is received, the state changes to state E 116. If the AS* signal is deasserted in decision block 118, then the disconnection phase has started and the state changes from state E 116 to the idle state A 100. If the AS* signal is still asserted and the Master Data Request signal is asserted in decision block 122 then the state remains unchanged. If the AS* signal is asserted and the Master Data Request Signal is not asserted, then the DI* signal is checked. If the DI* signal is still asserted in decision block 124, then the slave has not yet received the data from the last transfer. Once the DI* signal is deasserted by the slave, new data is clocked out onto the bus and the state changes from state E 116 to state F 126 for the beginning of another ODD beat. If the Master Data Request signal is not asserted in decision block 128, the state remains in state F 126. Once asserted the state changes to state G 130. If the AS* signal is not asserted in decision block 132, the state changes from state G 130 to the idle state A 100. If the AS* signal is still asserted and the Master Data Request signal is asserted in decision block 136, then the state remains in state G 130. When the Master Data Request signal is deasserted, the DK* signal is checked in decision block 138. If the DK* signal is asserted then the slave is still reading data off of the bus 10. Once the slave deasserts the DK* signal, new data is clocked out onto the bus, and the state changes from state G 132 to state D 112 to begin another EVEN data beat in the data transfer phase.

Figure 5:
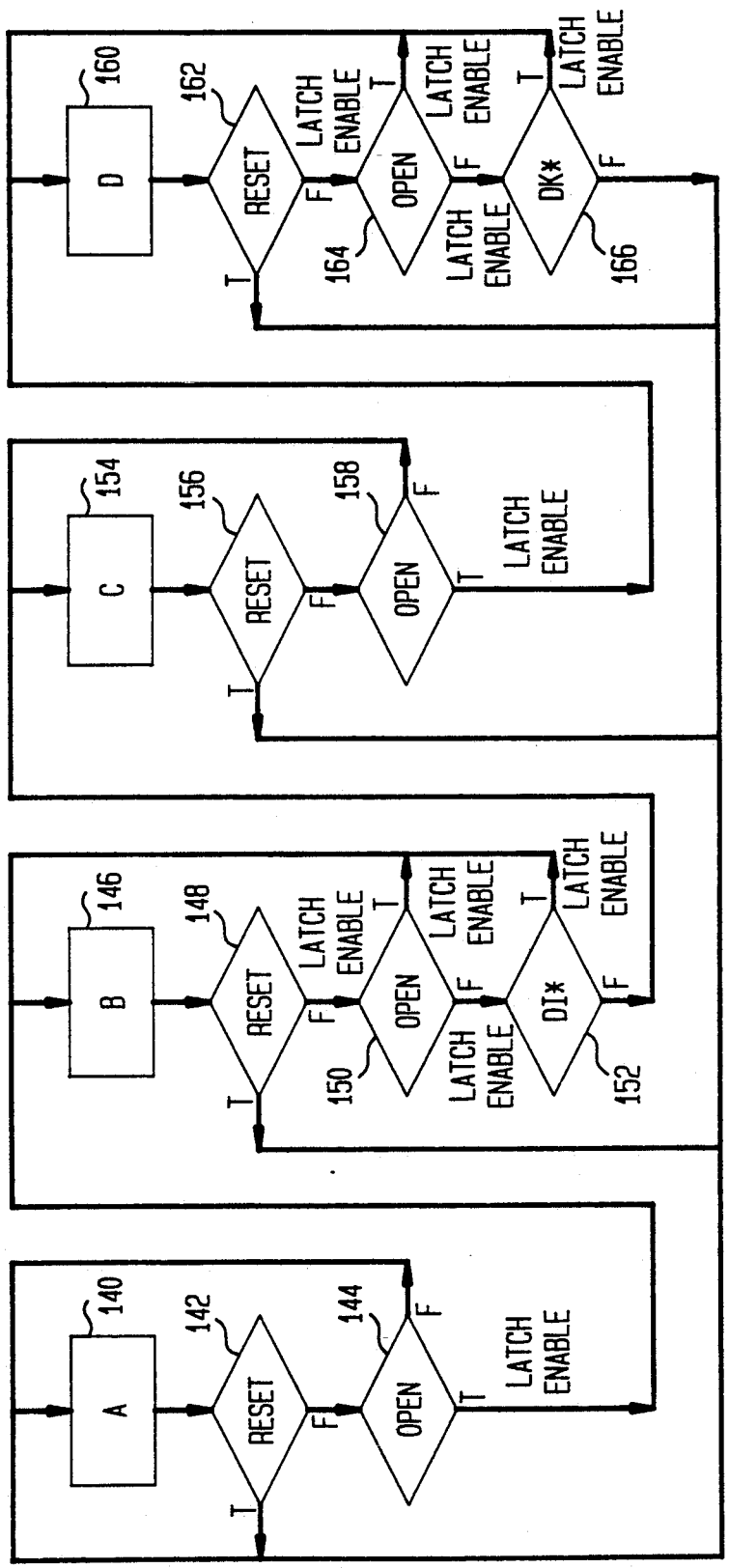
FIG. 5 is a flow diagram for the Latch Enable Control asynchronous state machine.

Referring to FIG. 5, the state flow diagram for the Latch Enable Control 34 is shown. Upon reset in decision blocks 142, 148, 156, and 162 control passes to an idle state A 140. This state indicates the start of an ODD data beat of the data transfer phase by default. If no reset signal is seen in decision block 142, control passes to decision block 144 where the Open signal is checked from the Master Access Control 24. If the signal is not asserted then control returns to state A. The Open signal serves as an enabling signal for the Latch Enable Control 34. Once the Open signal is asserted, a Latch Enable signal is generated, and the state changes to state B 146. As long as a reset signal is not asserted, the Latch Enable signal remains asserted, and the Open signal is once again checked in decision block 150. Once the Open signal is deasserted, the DI* signal is checked in decision block 152. If the DI* signal is asserted, then data has not yet been written to the bus 10 by the slave. When the data has been written to the bus by the slave, it is immediately latched. Once the DI* signal is deasserted in decision block 152, the Latch Enable signal is deasserted and the state changes to state C 154.

State C 154 indicates the start of the EVEN beat of the data transfer phase. As long as a reset signal is not asserted, the Open signal is again checked in decision block 158. If not asserted the state remains in state C 154, and if asserted, a Latch Enable signal is generated and the state changes from state C to state D 160. As long as a reset signal is not asserted, the Open signal is again checked in decision block 164. If the Open signal is asserted, the Latch Enable signal remains asserted, and the state remains in state D 160. If an Open signal is not asserted, the DK* signal is checked in decision block 166. Once the DK* signal is deasserted (indicating that the slave has placed valid data on the bus 10), the state changes from state D 160 to idle state A for another ODD data beat.

Figure 6:
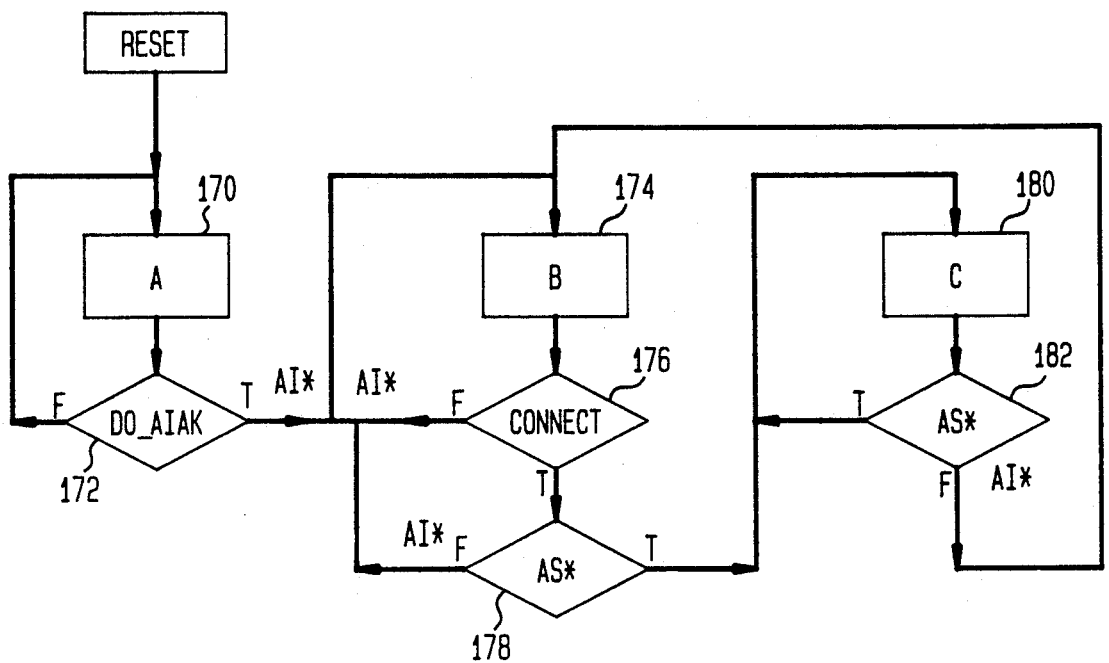
FIG. 6 is a flow diagram for the AI Signal Control asynchronous state machine.

Referring to FIG. 6, the state flow diagram for the AI Control 36 is shown. Upon reset, control starts in restart state A 170. A Do_AIAK signal asserted by the Slave Access Control 28 (not shown) indicates to the AI Control 36 and the AK Control 38 that the processors 14 and 16 are aligned on the bus 10. If the Do_AIAK signal is asserted in decision block 172, then AI* signal is asserted and the state changes to state B 174. The AI* signal remains asserted until an AS* signal is received from the bus 10. If the Connect signal has not been received from the Slave Access Control 28, then the AI* signal remains asserted. When the Connect signal is detected in decision block 176, then the AS* signal is checked in decision block 178. If the AS* signal is not asserted, then the connection phase has not begun and the AI* signal remains asserted. If the AS* signal has been asserted, then the state changes to state C 180 and the AI* signal is deasserted. Deassertion of the AI* signal indicates to the master that the slave is ready to receive/supply data and the end of the connection phase. As soon as the AS* signal is deasserted in decision block 182, the AI* signal is immediately asserted and the state changes to state B 174. The assertion of the AI* signal indicates that the slave has seen the AS* deassertion and will disconnect from the bus 10.

Figure 7:
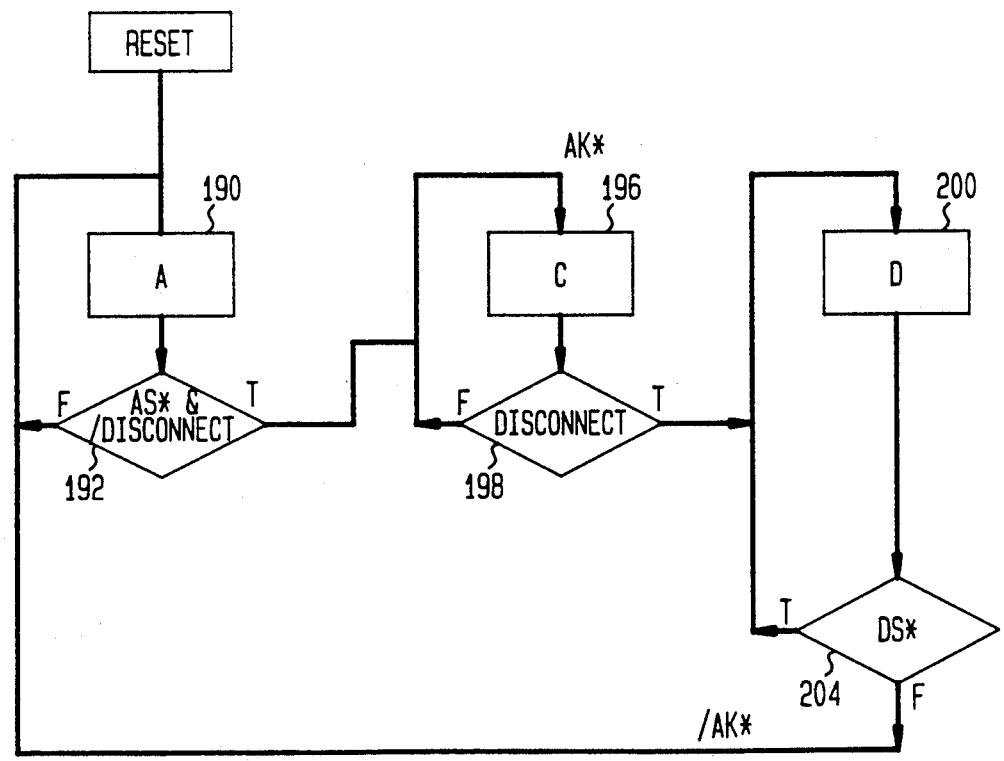
FIG. 7 is a flow diagram for the AK Signal Control asynchronous state machine.

Referring to FIG. 7, the flow diagram for the AK Control 38 is shown. Upon reset, control passes to an idle state A 190. If, in decision block 192, the AS* signal is asserted on the bus 10 and the Disconnect signal is not asserted from the Slave Access Control 28, then the state changes from state A 190 to state C 196, and the AK* signal is asserted. The assertion of the AK* signal indicates that the slave has seen the AS* signal from the master and is commencing the connection phase. If the Disconnect signal is not seen from the Slave Access Control 28 in decision block 198, then the AK* signal remains asserted. Once the Slave has asserted the Disconnect signal after the start of the disconnection phase, the state changes from state C 196 to state D 200. The DS* signal is checked in decision block 204. If the DS* signal is deasserted, then the AK* signal is deasserted (indicating the end of the disconnection phase), and the state changes from state D 200 to idle state A 190.

Figure 8:
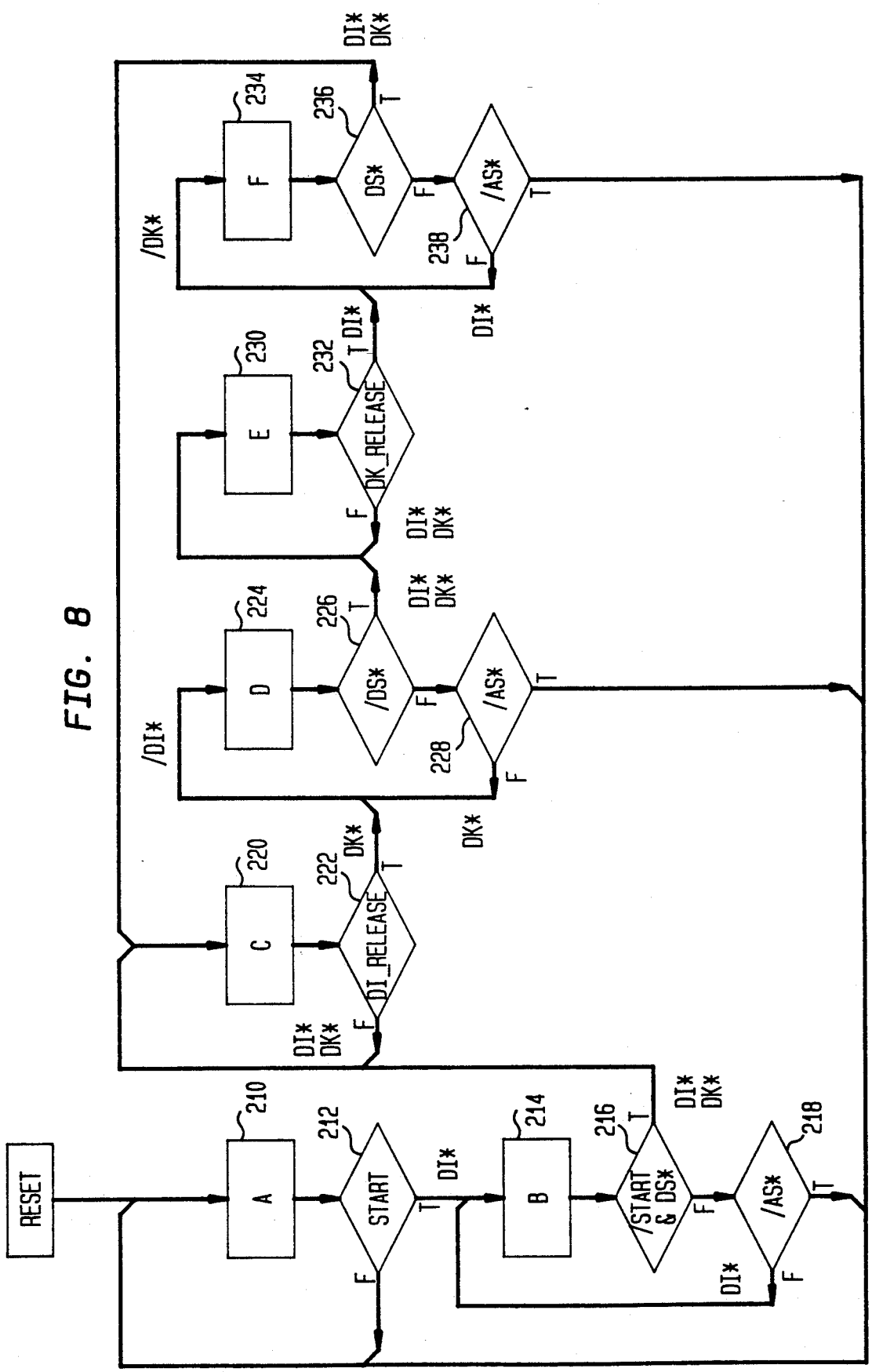
FIG. 8 is a flow diagram for the DIDK Signal Control asynchronous state machine.

Referring to FIG. 8, the flow diagram for the DIDK Control 40 is shown. Upon reset, control passes to an idle state A 210. In decision block 212, when a Start signal is received from the Slave Access Control 28, the state changes to state B 214 and the DI* signal is asserted in preparation for the data transfer phase. In decision block 216, if the Start signal is asserted or the DS* signal is deasserted, then the AS* signal is checked in decision block 218. If the AS* signal is deasserted then no data transfer phase is to occur and the state changes to idle state A 210. If, in decision block 216, the Start signal has been deasserted and the DS* signal is asserted then the ODD data beat has begun, and the DK* and DI* signals are asserted. The assertion of the DK* signal indicates that the slave has seen the DS* signal. The state also changes to state C 220. If the DI_Release signal has not been received from the Slave Access Control 28, then the DI* and DK* signals remain asserted. The DI_Release signal indicates that the slave has read or written valid data from/to the bus 10. When the DI_Release signal is received, the DK* signal is again asserted to insure it is ready for the EVEN data beat, the state changes from state C 220 to state D 224, and DI* is deasserted.

If DS* is asserted in decision block 226, then the AS* signal is checked in decision block 228. If AS* is not asserted then the data transfer phase has ended and the state changes from state D 224 to idle state A 210. Once DS* is deasserted, the EVEN data beat begins and the DK* and DI* signals are asserted as the state changes from state D 224 to state E 230. The assertion of the DI* signal indicates that the slave has seen the deassertion of the DS* signal. If the DK_release signal is not seen from the Slave Access Control 28 in decision block 232, then the data has not yet been transferred to or read from the bus 10 (the DI* and DK* signals remain asserted). Once the DK_release signal is seen, the DI* signal remains asserted, the DK* signal is deasserted, and the state changes to state F 234. If the DS* signal is seen in decision block 236, then another ODD data beat has begun and the DI* and DK* signals are both asserted and the state changes from state F 234 to state C 220. If the DS* signal is not asserted and the AS* signal is not asserted in decision block 238, then the data transfer phase has terminated, and the state changes from state F 234 to idle state A 210.

Figure 9:
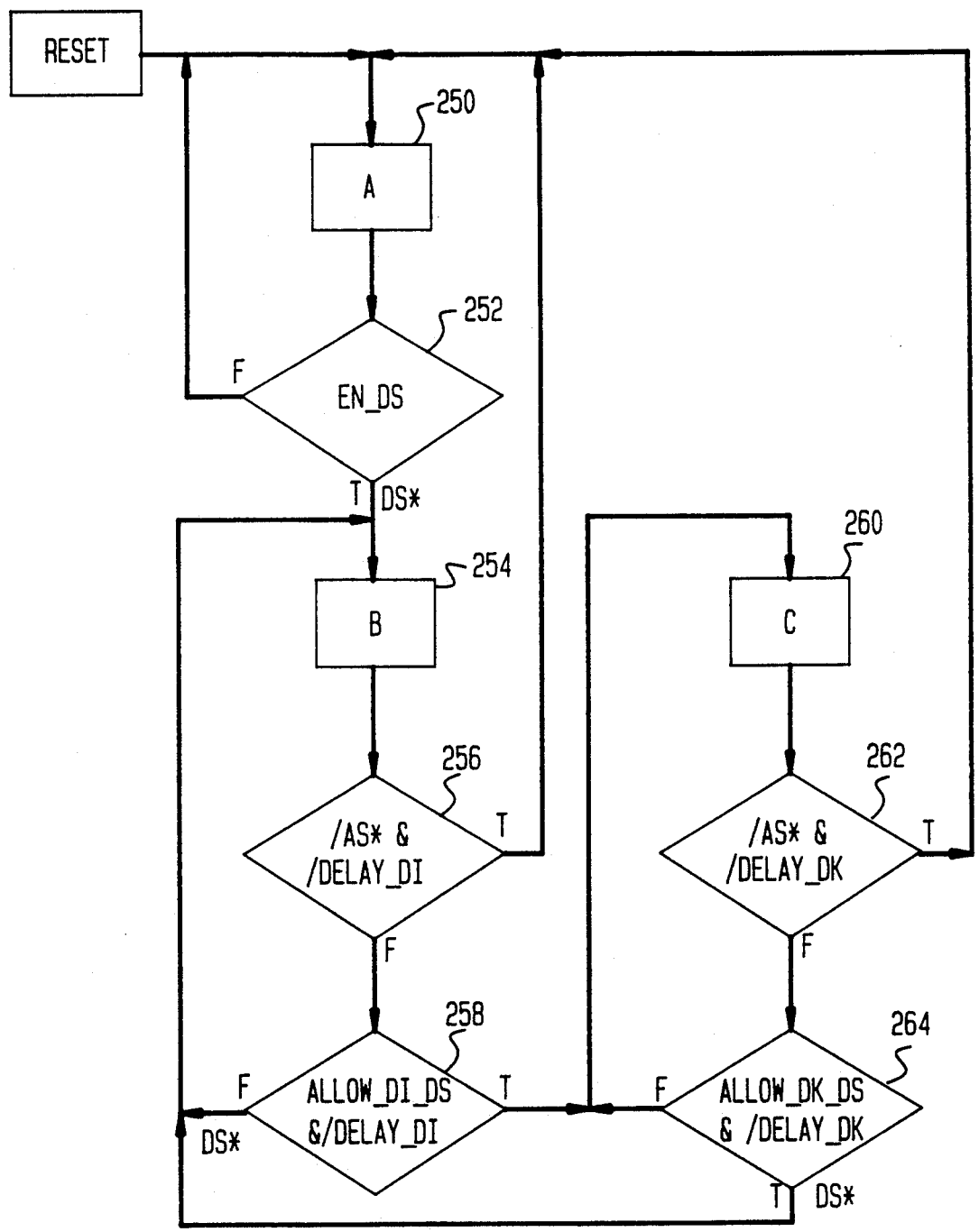
FIG. 9 is a flow diagram for the DS Signal Control asynchronous state machine.

Referring to FIG. 9, the state flow diagram for the DS control 42 is shown. Upon reset control passes to idle state A 250. In decision block 252, when a EN_DS signal is received from the Master Access Control 24, the data transfer phase is to be commenced. The DS* signal is asserted indicating the beginning of the ODD data beat, and the state changes to state B 254. The AS* and Delay_DK signals are checked in decision block 256. If the AS* signal and the Delay_DK signal are not asserted then the data transfer phase has terminated and the state changes from state B 254 to idle state A 250. If the Allow_DI_DK signal is asserted by the Master Access Control 24 and the Delay_DI signal is not asserted then the state changes from state B 254 to state C 260, and the DS* signal is deasserted (indicating the beginning of the EVEN beat of data). Otherwise, the slave is not ready for the EVEN data beat (i.e., the DI* signal is asserted) or the master is not ready (i.e., Allow_DI_DS signal is deasserted), and the DS* signal remains asserted If the AS* signal and the Delay_DK signal are deasserted in decision block 262 then the data transfer phase has terminated, and the state changes to the idle state A 250. When the Allow_DK_DS signal is received from the Master Control Access 24 and the Delay_DK signal is received then the DS* signal is asserted and the state changes from state C 260 to state B 254 (indicating the beginning of another ODD data beat). Otherwise, the slave and/or master is not ready for the next ODD data beat and the state remains in state C 260.

Figure 10A:
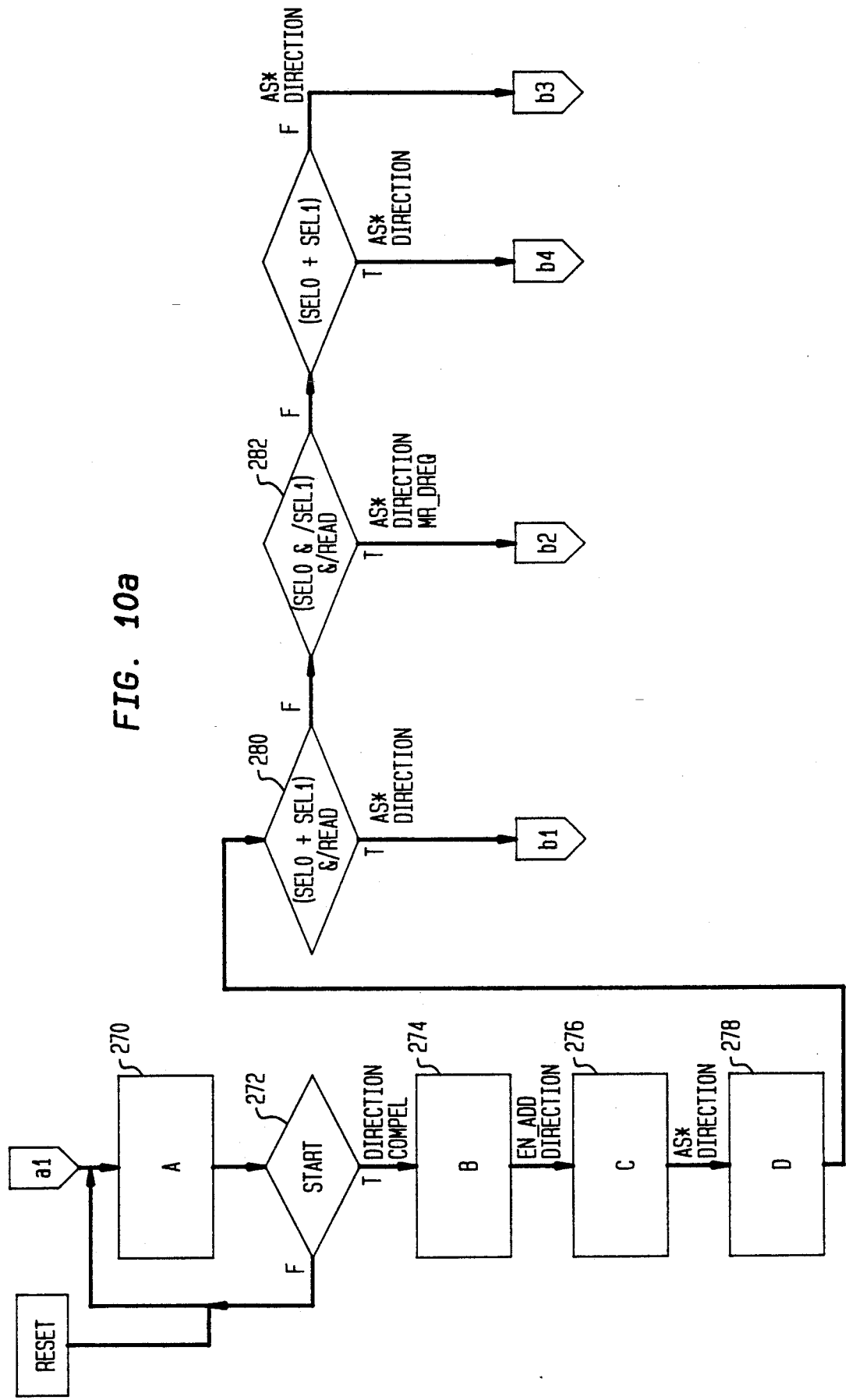

Referring to FIGS. 10a-g, the state flow diagram for the Master Access Control 24 is shown. As seen in FIG. 10a, control passes to idle state A 270 upon reset. The Start signal is checked in decision block 272. The Start signal is generated by the Arbitration Controller 22 and indicates that one of the processors 14 or 16 has been granted access to the bus 10 as a master. Once, the Start signal has been detected, the Compel signal is generated for the Command Generator 44 and the Direction signal is generated for the bus transceivers 15 (address and data information will be sent out to the bus 10). The state changes from state A 270 to state B 274. Once address data is valid at the transceivers 15, an En_Add signal is sent to the Transceiver Clock Control 32 in order to clock the address out onto the bus 10. The state changes from state B 274 to state C 276. Once the address has been clocked out onto the bus, the AS* signal is asserted and the state changes to state D 278. The Select 0 and Select 1 signals are checked in decision blocks 280, 282, and 284.

Self Write

Figure 10B:
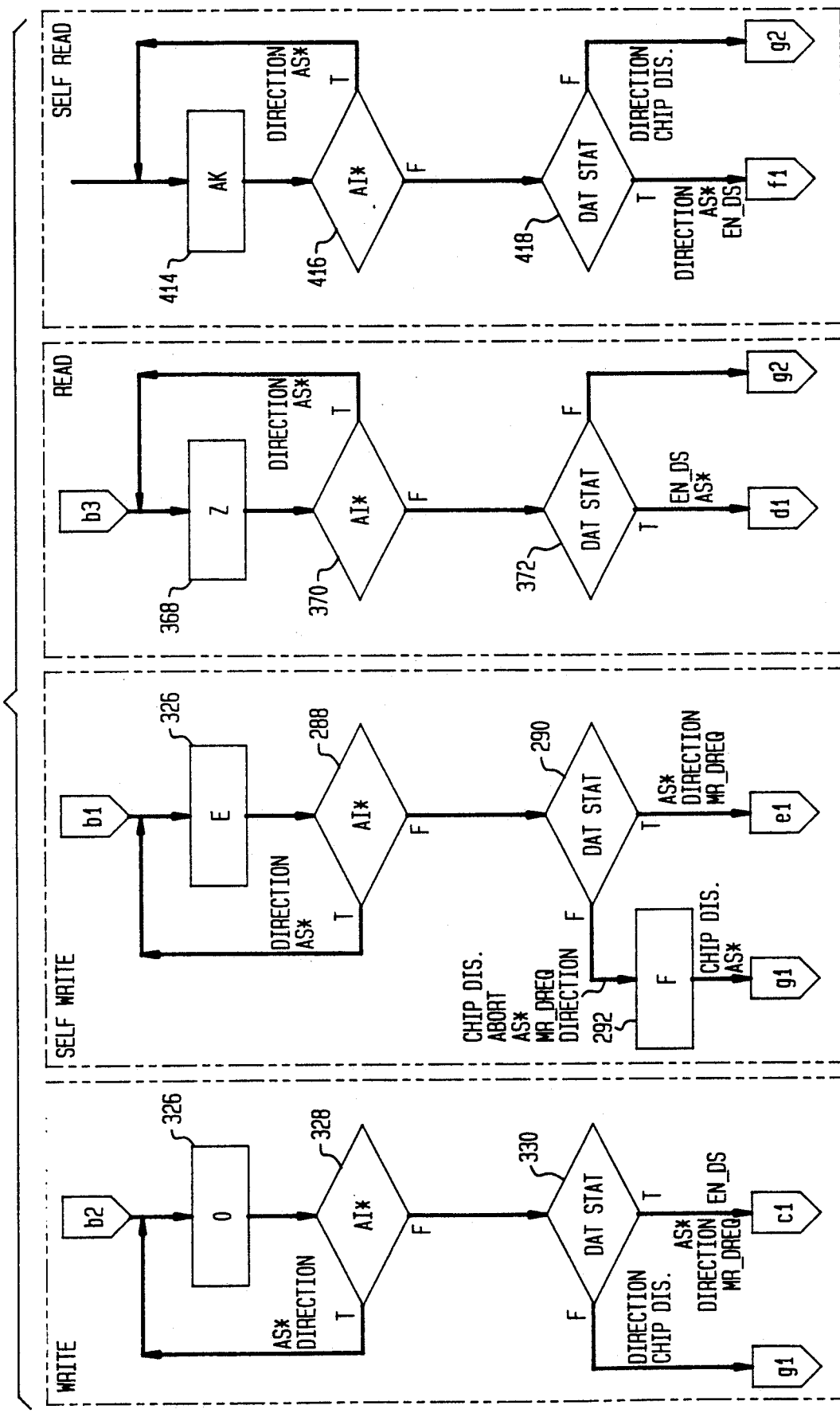
Figure 10C:
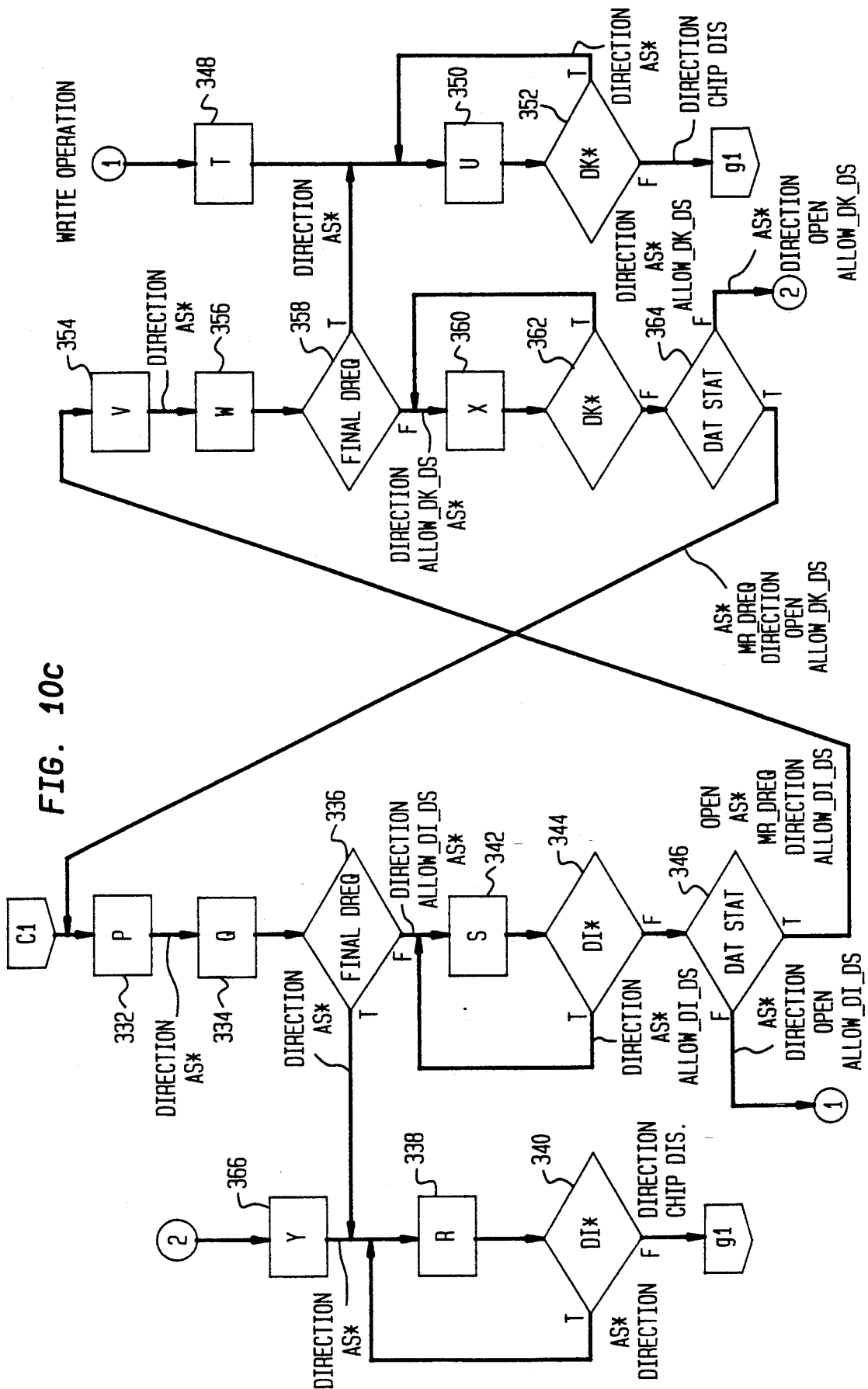

If either of the Select signals are asserted and a Read signal is not asserted, then the state changes from state D 278 to state E 286 (see FIG. 10b). Assertion of either Select signal and deassertion of the Read signal indicates that one of the processors 14 or 16 is writing data to another local processor 14 or 16. In decision block 288, the AI* signal is checked. Once the AI* signal has been deasserted (indicating the slave has read the address information off of the bus 10), then the status signals are checked in decision block 290. The status signal is a Data Status signal received from the Status Generator 20. If the status signals from the slave indicate that the self-write operation cannot be performed, the Master Access Control 24 asserts the Chip Disable signal to the bus transceivers 15 and an Abort signal is sent to the Arbitration Control 22. The state then changes from state E 286 to state F 292, and then changes to a termination state before returning to idle state A 270 (as will be described with FIG. 10g).

Figure 10E:
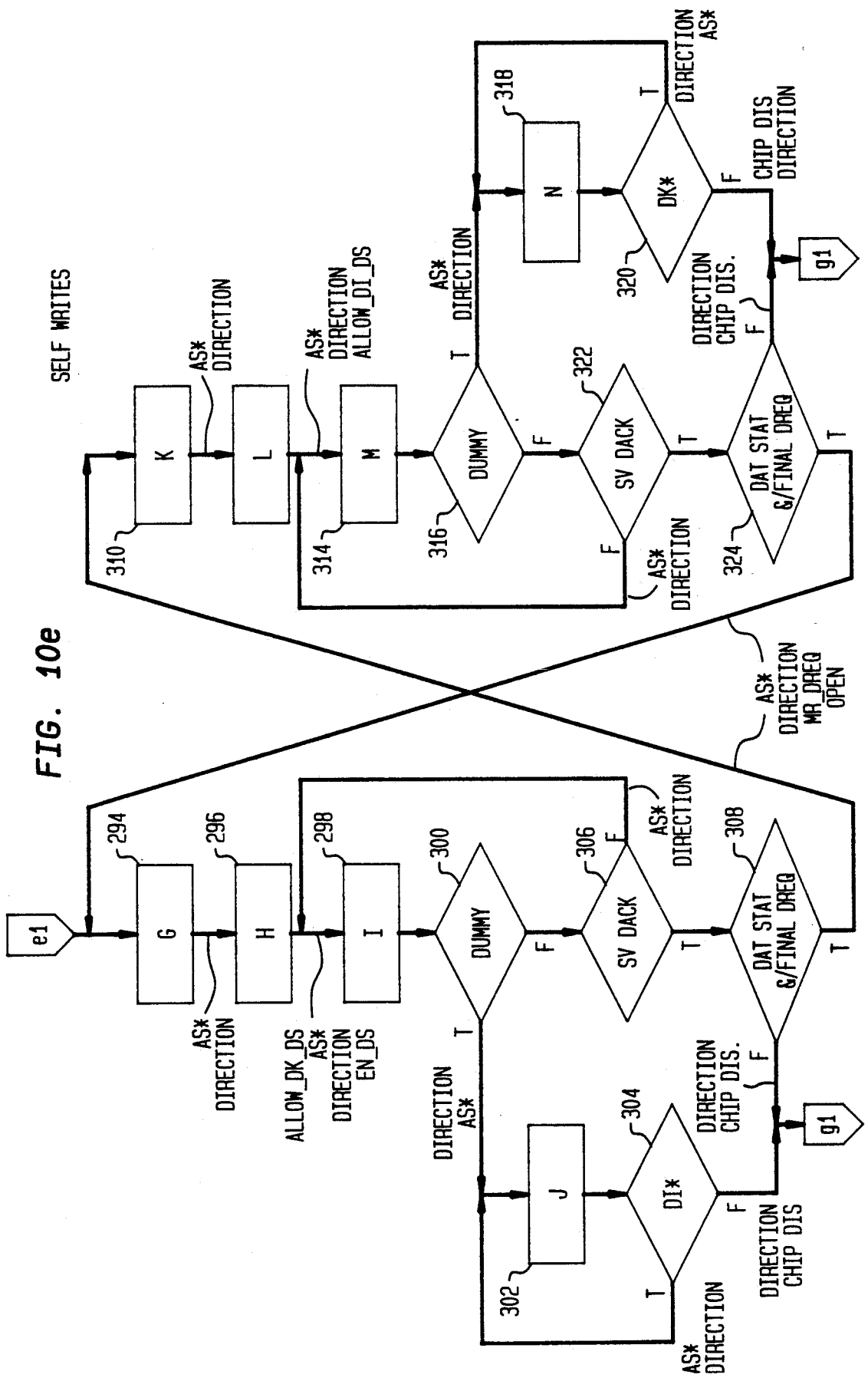

If the Data Status signal is asserted in decision block 290 then the state changes from state E 286 to state G 294 (FIG. 10e). State G 294 is a wait state, and the data are written to the data transceivers 15. The state changes to state H 296 and the EN_DS and Allow_DK_DS signals are generated for the DS Control 42, and then the state changes to state I 298. In decision block 300, the Dummy signal is checked from the Slave Access Control 28. If set then the slave has run out of data and the state changes from state I 298 to state J 302. Once the DI* signal has been deasserted in decision block 304, the state changes to a termination state which will be described with reference to FIG. 10g. If the Dummy signal has not been set, then the Slave Data Acknowledge signal is checked in decision block 306. If the Slave Data Acknowledge signal is deasserted then the slave has received the data. In decision block 308, the Data Status and Final Data Request signals are checked. If the Data Status Signal is set and the Final Data Request signal is deasserted, then the state changes from state I 298 to state K 310 and the EVEN data beat begins.

Another Master Data Request signal is sent to the master processor 14 or 16 and an Open signal is sent to the Latch Enable Control 34. The state then changes to state L 312 and the Allow_DI_DS signal is sent to the DS Control 42. In state M 314 the data written by the slave is now valid on the bus 10, and the Master Access Control 24 awaits deassertion of the DK* signal. In decision block 316, the Dummy signal is again checked and if set then the state changes to state N 318 indicating that the slave is out of data. Once the DK* signal is deasserted in decision block 320, the state changes to a termination state (see FIG. 10g). If the Dummy signal is not asserted, the Slave Data Acknowledge signal is checked in decision block 322. Once the Slave Data Acknowledge signal is deasserted, the Data Status and Final Data Request signals are once again checked in decision block 324. If the Data Status signal is asserted and the Final Data Request signal is deasserted, the state changes from state M 314 to state G 294 for another ODD data beat. Otherwise, control goes to a termination state (see FIG. 10g).

Write

Referring back to FIG. 10a, if both of the Select signals are deasserted and the Read signal is deasserted in decision block 282, then the state changes from state D 278 to state O 326 (see FIG. 10b). In this situation the master processor is writing to another, external processor coupled to the bus 10. The AI* signal is checked in decision block 328. Once the AI* signal has been deasserted by the slave, the Data Status signal is checked in decision block 330. If deasserted, then control passes to a termination state of FIG. 10g. If asserted, the state changes from state O 326 to state P 332 (FIG. 10c), and the Master Data Request signal is asserted and the EN_DS signal is sent to the DS Control 42. The state changes from state P 332 to state Q 334 and the data is clocked out onto the bus 10. In decision block 336, if the transaction is the Final Data Request Signal (as indicated by the Submaster Access Control 26), then the state changes to state R 338. Once the DI* signal has been deasserted in decision block 340 the state changes to a termination state of FIG. 10g. If the data transaction is not the Final Data Request, then the state changes from state Q 334 to state S 342, and the Allow_DI_DS signal is generated for the DS control 42. Once the DI* signal is deasserted in decision block 344 the Data Status signal is checked in decision block 346. If the Data Status signal is deasserted then the Open signal is sent to the Latch Enable Control 34 and the Allow_DI_DS signal is sent to the DS Control 42. The state then changes from state S 342 to state T 348 to state U 350. Once the DK* signal is deasserted in decision block 352, the state changes to a termination state of FIG. 10g. If the Data Status signal is asserted in decision block 346, then the state changes from state S 342 to state V 354 for the EVEN data beat. The state changes to state W 356 and the new data is clocked out onto the bus 10. If the transaction is the Final Data Request in decision block 358, then the state changes from state W 356 to state U 350. Otherwise, the state changes to state X 360 and the Allow_DK_DS signal is sent to the DS Control 42. Once the DK* signal is deasserted in decision block 362, the Data Status signal is checked in decision block 364. If the Data Status signal is deasserted, then an Open signal is sent to the Latch Enable Control 34 and the state changes to state Y 366 before changing to state R 338 to insure the DI* signal is deasserted. If the Data Status signal is asserted then the state changes from state X 360 to state P 332 for the next ODD data beat.

Read

Referring to FIG. 10a, if both of the Select signals are deasserted and the Read signal is asserted then the state changes from state D 278 to state Z 368 (FIG. 10b). This indicates that the master processor is doing a read operation with an external slave. Once the AI* signal has been deasserted by the slave in decision block 370, the Data Status signal is checked in decision block 372. If the Data Status signal is deasserted, then the state changes to a termination state of FIG. 10g. If the Data Status signal is asserted, then the state changes from state Z 368 to state AA 374 (FIG. 10d) and the EN_DS signal is sent to the DS Control 42. In decision block 376, if the data transaction is a Final Data Request then the state changes to state AB 378. Once the DI* signal is deasserted on the bus 10 in decision block 380, the Data Status signal is checked in decision block 382. If asserted, then the Open signal is generated for the Latch Enable Control and a Master Data Request signal is sent to the master processor 14 or 16. The state then changes from state AB 378 to a termination state of FIG 10g. If the data transaction is not a Final Data Request, then the state changes from state AA 374 to state AC 384, and the Allow_DI_DS signal is sent to the DS Control 42. Once the DI* signal is deasserted in decision block 386, the Data Status signal is checked in decision block 388. If the Data Status signal is deasserted, the state changes to state AD 390, and the Open signal is sent to the Latch Enable Control 34. The state then changes to AE 392 and remains in that state until the DK* signal is deasserted in decision block 394. If the Data Status Signal is asserted in decision block 396, then an Open signal is sent to the Latch Enable Control 34 and a Master Data Request signal is sent to the master processor 14 or 16. The state then changes to a termination state of FIG. 10g.

If the Data Status signal is asserted in decision block 388, then the state changes from state AC 384 to state AF 398, and the Open signal is sent to the Latch Enable Control 34 and the Master Data Request signal is sent to the master processor 14 or 16. The state then changes to state AG 400 which is a wait state to insure that data from the previous beat has been latched by the master processor 14 or 16. If the next EVEN data beat is the Final Data Request in decision block 402, then the state changes from state AG 400 to state AE 392. Otherwise, the Allow_DK_DS signal is sent to the DS Control 42 and the state changes to state AH 404. Once the DK* signal has been deasserted in decision block 406, the Data Status signal is checked in decision block 408. If deasserted, then the Open signal is sent to the Latch Enable Control 34, and the state changes to state AI 410 and then to state AB 378. If the Data Status signal is asserted then the state changes from state AH 404 to state AJ 412, and the Open signal is sent to the Latch Enable Control 34 and a Master Data Request signal is sent to the master processor 14 or 16. The state then changes to state AA 374 for the next ODD data beat.

Self Read

Figure 10F:
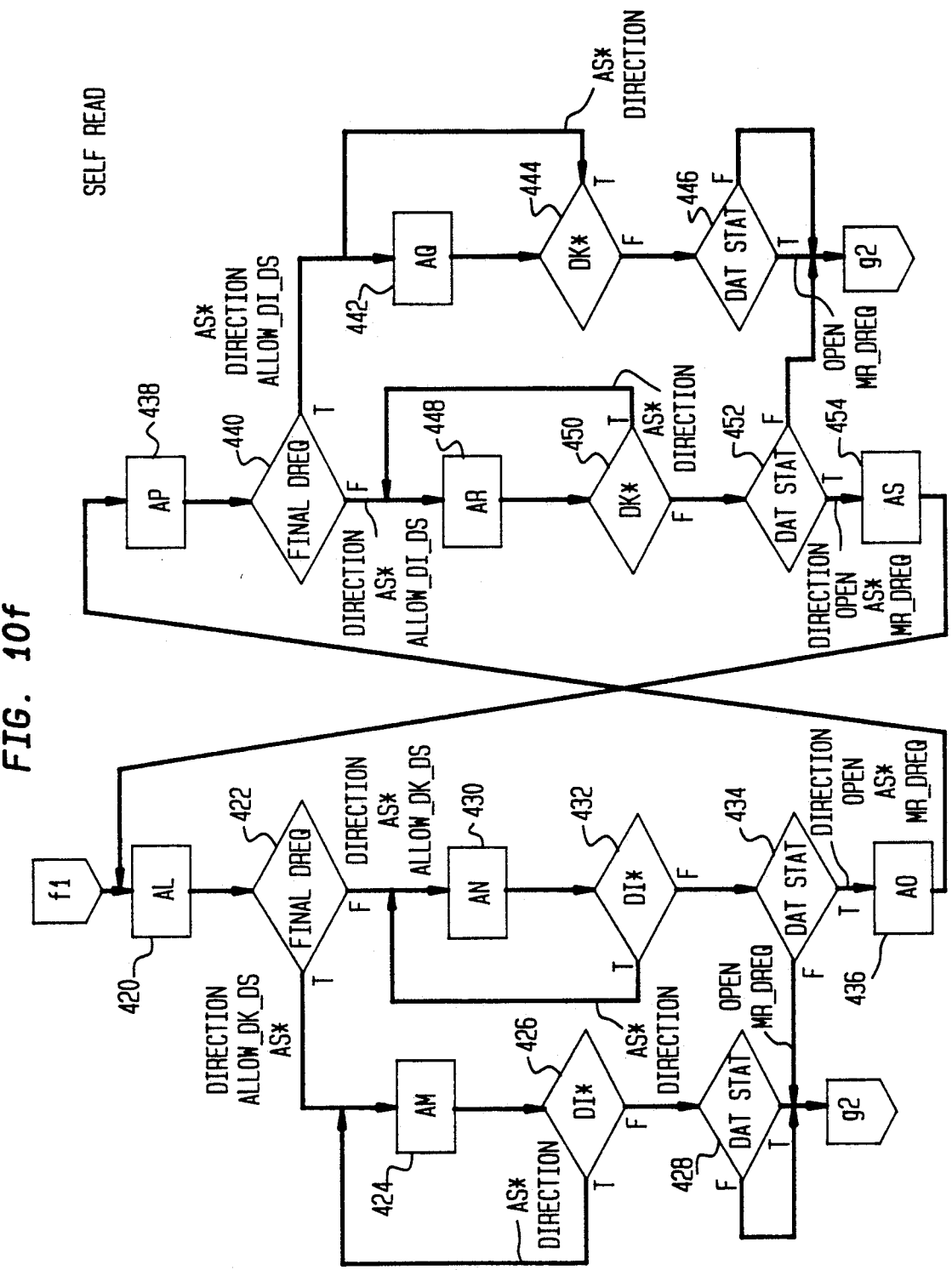

Referring to FIG. 10a, if either of the Select signals are asserted and the Read signal is asserted then the state changes from state D 278 to state AK 44 (FIG. 10b). Setting the Read and Select signals in this manner indicates a master processor 14 or 16 is reading from an internal slave. Once the AI signal is deasserted in decision block 416, the Data Status signal is checked in decision block 418. If deasserted then a Chip Disable signal is sent to the data transceivers 15 and the state changes to a termination state of FIG. 10g. If the Data Status signal is asserted, then the address information is sent out to the bus 10, the EN_DS signal is sent to the DS Control 42, and the state changes to state AL 420 (FIG. 10f). In decision block 422, if the data transaction is the Final Data Request then the state changes from AL 420 to state AM 424. Once the DI* signal is deasserted in decision block 426, the Data Status signal is checked in decision block 428. If asserted, the Open signal is sent to the Latch Enable Control 34, and the Master Data Request signal is sent to the master processor 14 or 16. The state then changes to a termination state of FIG. 10g. If the data transfer is not a Final Data Request, then the state changes from AL 420 to state AN 430. Once the DI* signal is deasserted in decision block 432, the Data Status signal is checked in decision block 434. If the Data Status signal is deasserted the state changes to a termination state of FIG. 10g. Otherwise, the Open signal is sent to the Latch Enable Control 34 and the Master Data Request signal is sent to the master processor 14 or 16, and the state changes to state AO 436. The new data is transferred to the master processor 14 or 16 and the state changes to state AP 438 for the EVEN data beat.

If the data transfer is a Final Data Request in decision block 440, the Allow_DI_DS signal is sent to the DS Control 42 and the state changes to state AQ 442. Once the DK* signal is detected in decision block 444, the Data Status signal is checked in decision block 446. If asserted, the Open signal is sent to the Latch Enable Control 34 and the Master Data Request signal is sent to the master processor 14 or 16. The state then changes to a termination state of FIG. 10g. If the data transfer is not a Final Data Request, then the state changes from state AP 438 to state AR 448. Once the DK* signal is deasserted in decision block 450, the Data Status signal is checked in decision block 452. If the Data Status signal is deasserted then the state changes to a termination state of FIG. 10g. Otherwise, the Open signal is sent to the Latch Enable Control 34, the Master Data Request signal is sent to the master processor 14 or 16 and the state changes to state AS 454. The state then changes to state AL 420 for the next ODD data beat.

Termination

Figure 10G:
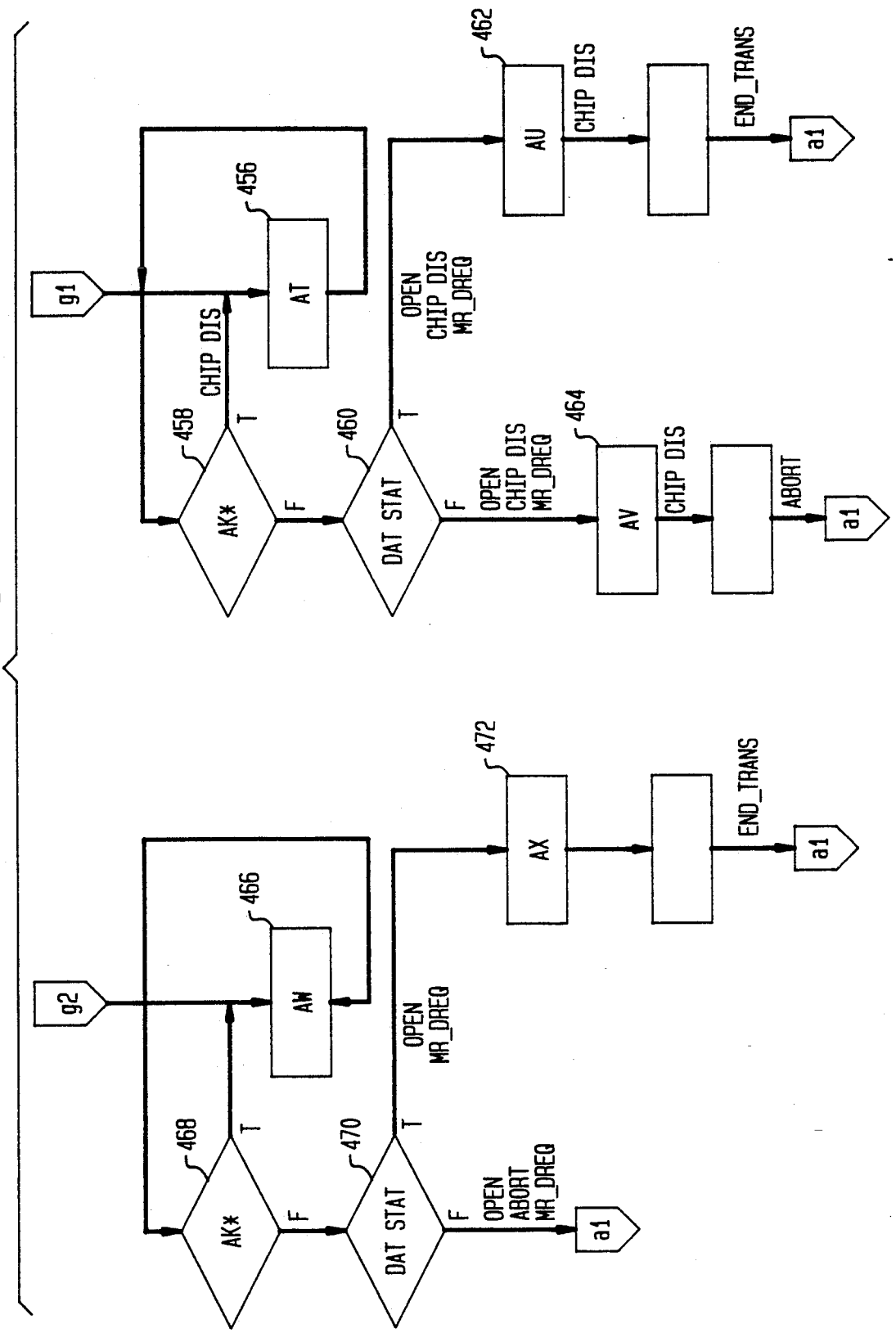

Referring to FIG. 10g, the termination states for read and write operations are shown. When a write operation is being performed, the state eventually changes to a write termination state AT 456 until the AK* signal is deasserted in decision block 458. Once the AK* signal is deasserted, the Data Status signal is checked in decision block 460. If asserted, the Open signal is sent to the Latch Enable Control 34 and the Master Data Request signal is sent to the master processor 14 or 16 and the state changes to state AU 462. The Chip Disable signal is sent to the data transceivers 15, the END_TRANS signal is sent to the Arbitration Control 22, and the state changes to idle state A 270 (FIG. 10a). If the Data Status signal is deasserted then the Open signal is sent to the Latch Enable Control 34 and the Master Data Request signal is sent to the master processor 14 or 16. The state then changes to state AV 464. An Abort signal is sent to the Arbitration Control 22, and the state changes to idle state A 270.

When terminating a read operation the state eventually changes to a read termination state AW 466. Once the AK* signal is deasserted in decision block 468 the Data Status signal is checked in decision block 470. If deasserted, an Open signal is sent to the Latch Enable Control 34, a Master Data Request signal is sent to the master processor 14 or 16, and an Abort signal is sent to the Arbitration Control 22. The state then changes to idle state A 270. If the Data Status signal is asserted, then the state changes to state AX 472 and an Open signal is sent to the Latch Enable Control 34, and a Master Data Request signal is sent to the master processor 14 or 16. The END_TRANS signal is sent to the Arbitration Control 22, and the state then changes to idle state A 270.

Figure 11:
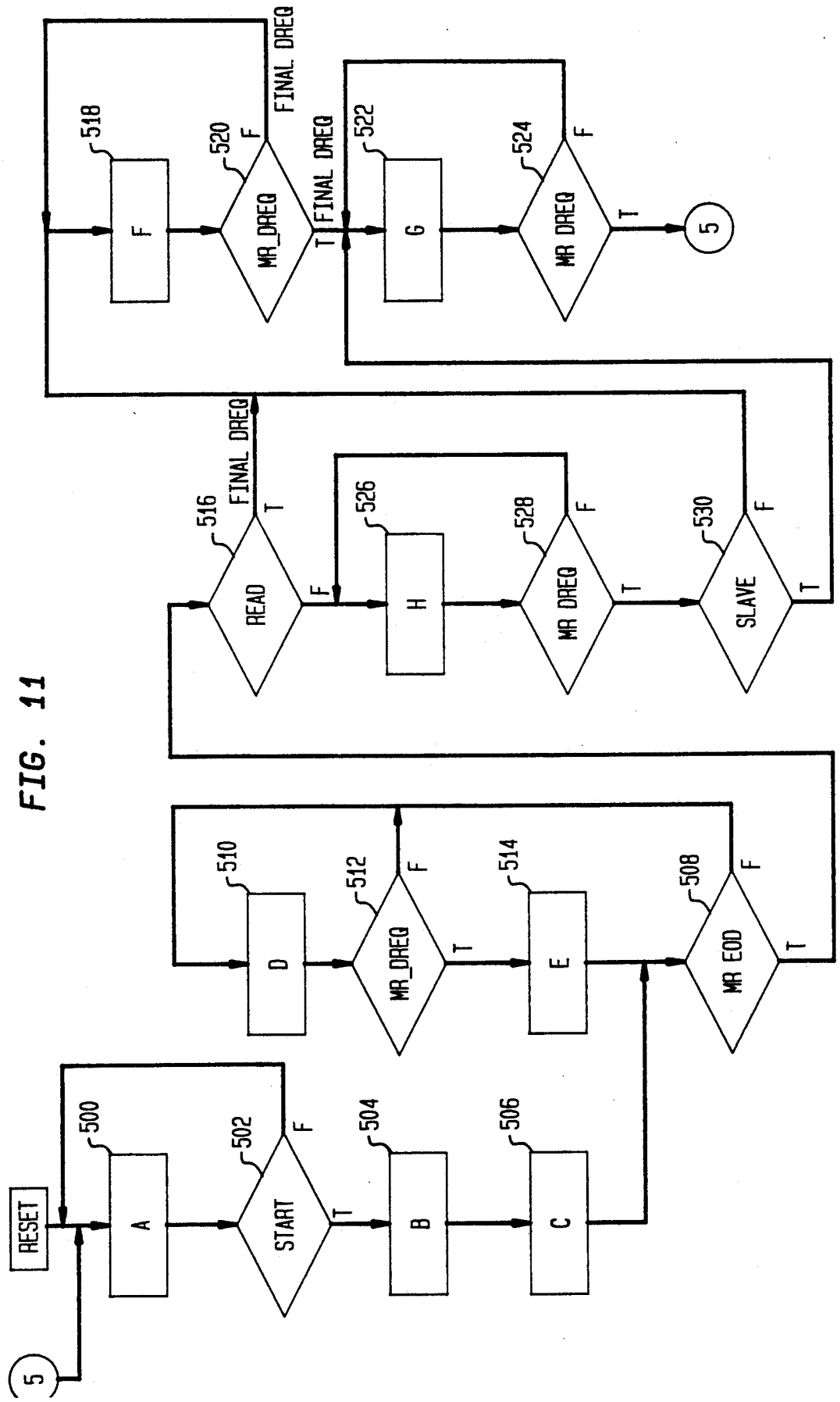
FIG. 11 is the flow diagrams for the Submaster Access Control synchronous state machine.
Figure 13:
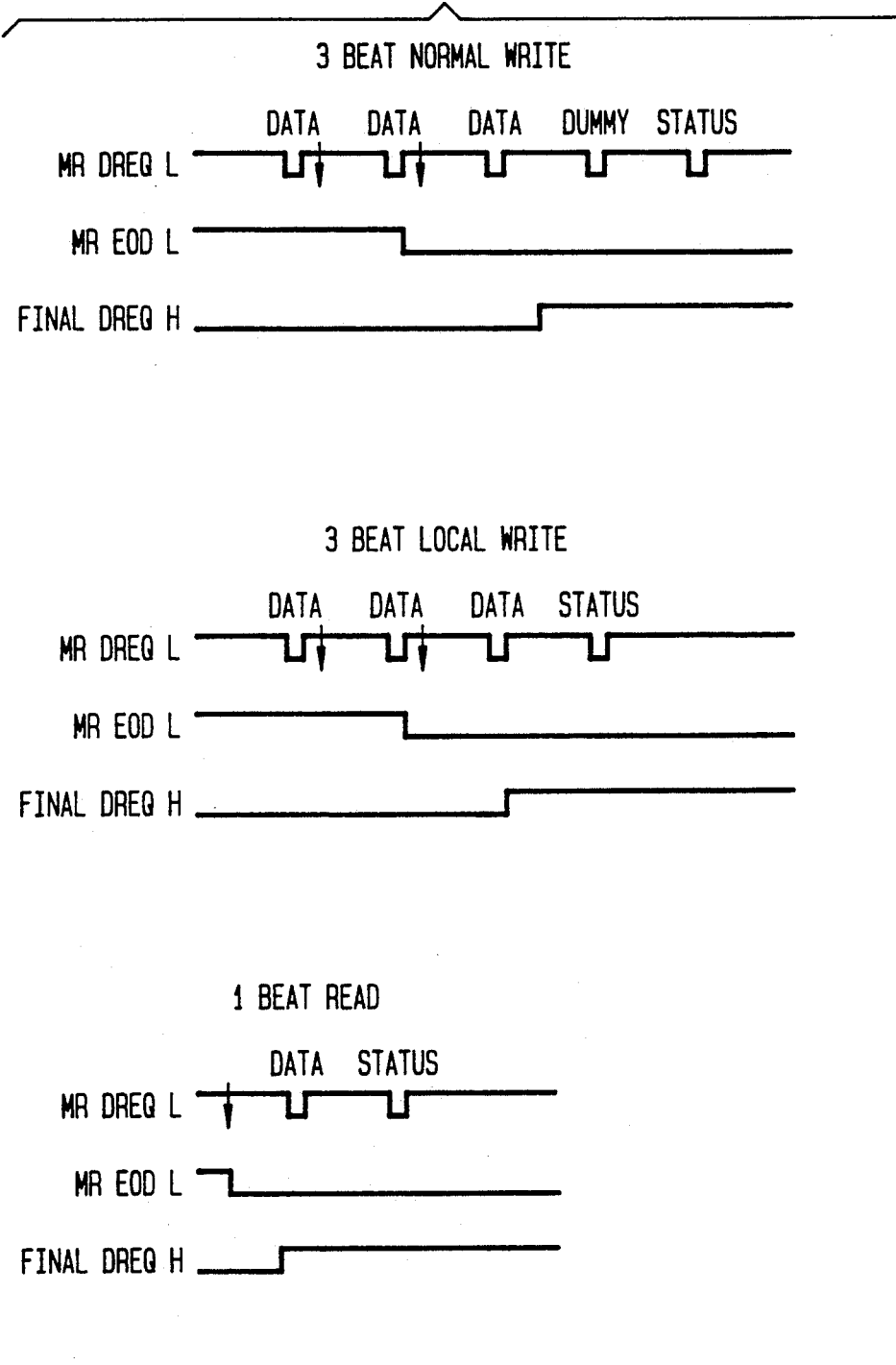
FIG. 13 is a timing diagram showing End-Of-Data and Data Request signals associated with read and write operations.

Referring to FIG. 11, the state flow diagram for the Submaster Access Control 26 is shown. Upon reset, control passes to idle state A 500. When a Start signal is detected in decision block 502 from the Arbitration Control 22, the state changes to state B 504, which is a first delay cycle. The state then changes to state C, a second delay cycle. In decision block 508, the Master End-Of-Data signal is checked, if not asserted, the state changes to state D 510 in order to wait for the next Master Data Request. Once the Master Data Request signal is asserted in decision block 512, the state changes to state E 214 to check for the Master End-Of-Data signal, again. Once the Master End-Of-Data signal is asserted the Read signal is checked in decision block 516. If asserted then the Final Data Request signal is sent to the Master Access Control 24 and the state changes to state F 518. In decision block 520, once the last Master Data Request signal is asserted, the state changes to state G 522, which is a wait state for the status data to become valid at latch 30. In decision block 524, once the Master Data Request signal is asserted for the final time the state changes again to idle state A 500. If the Read signal is not asserted in decision block 516, the state changes to state H 526 and waits for the next Master Data Request signal in decision block 528. Once asserted, the Slave signal is checked in decision block 530. If asserted, then a local access was performed and one less Master Data Request signal will be generated, and the state changes to state G 522. Otherwise, the state changes to state F 518 to wait for the extra Master Data Request Signal. The timing diagram for the Master Data Request, Master End-Of-Data and Final Data Request signals is shown in FIG. 13. The downward arrows of FIG. 13 indicated when the Master Data Request signal is sampled by the Submaster Access Control 26.

Figure 12A:
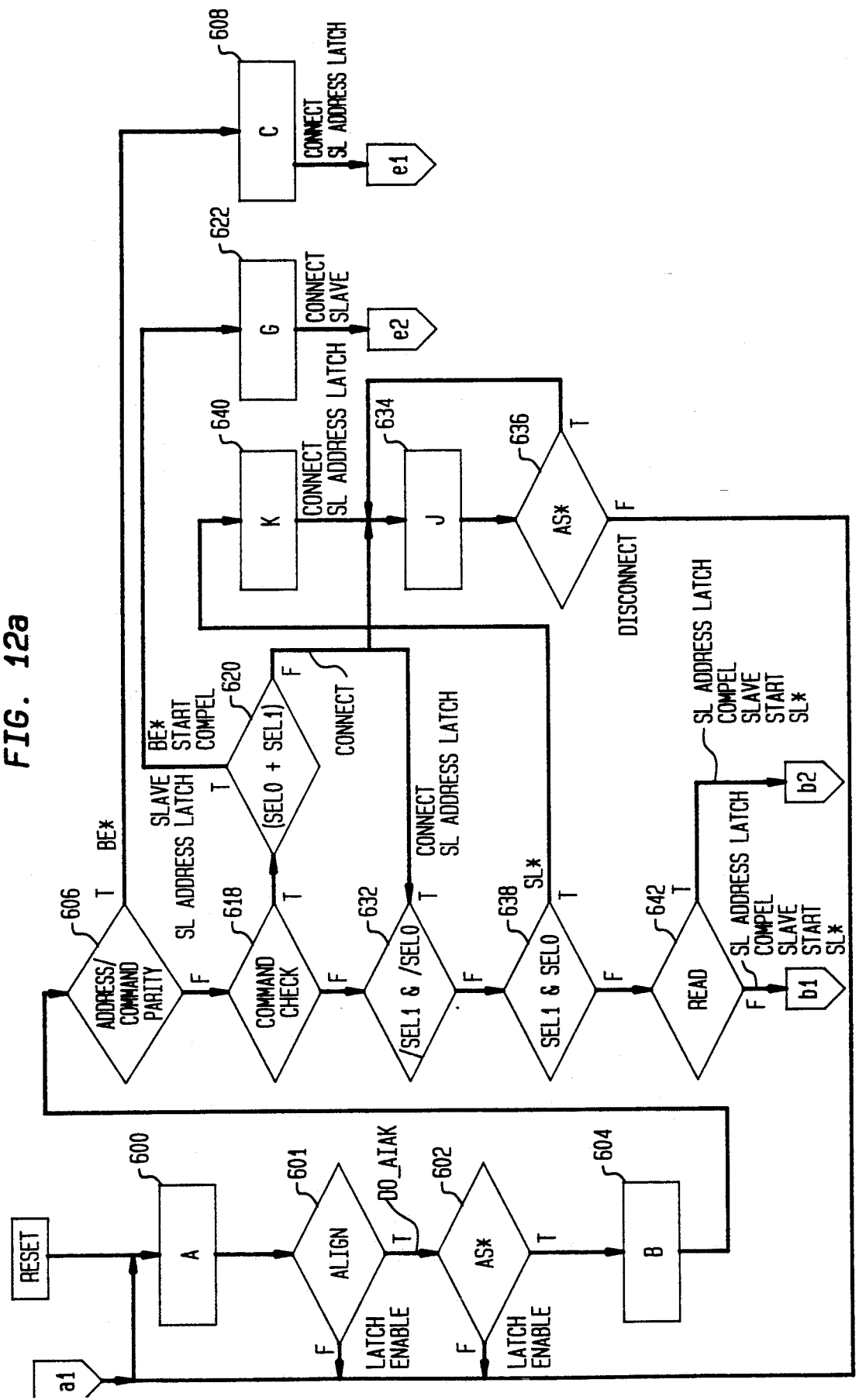
FIGS. 12a-g are the flow diagrams for the Slave Access Control synchronous state-machine.
Figure 12B:
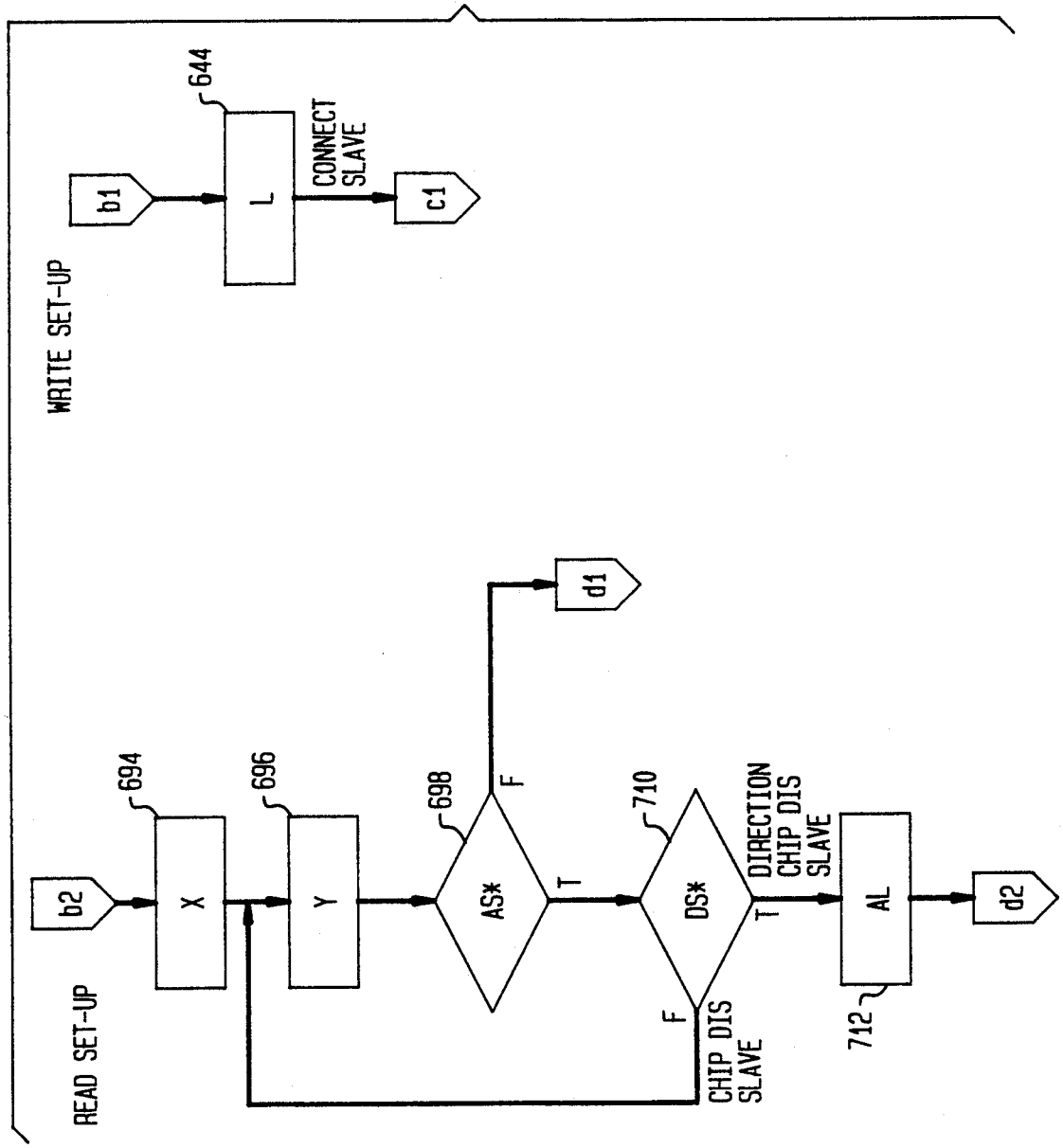
Figure 12C:
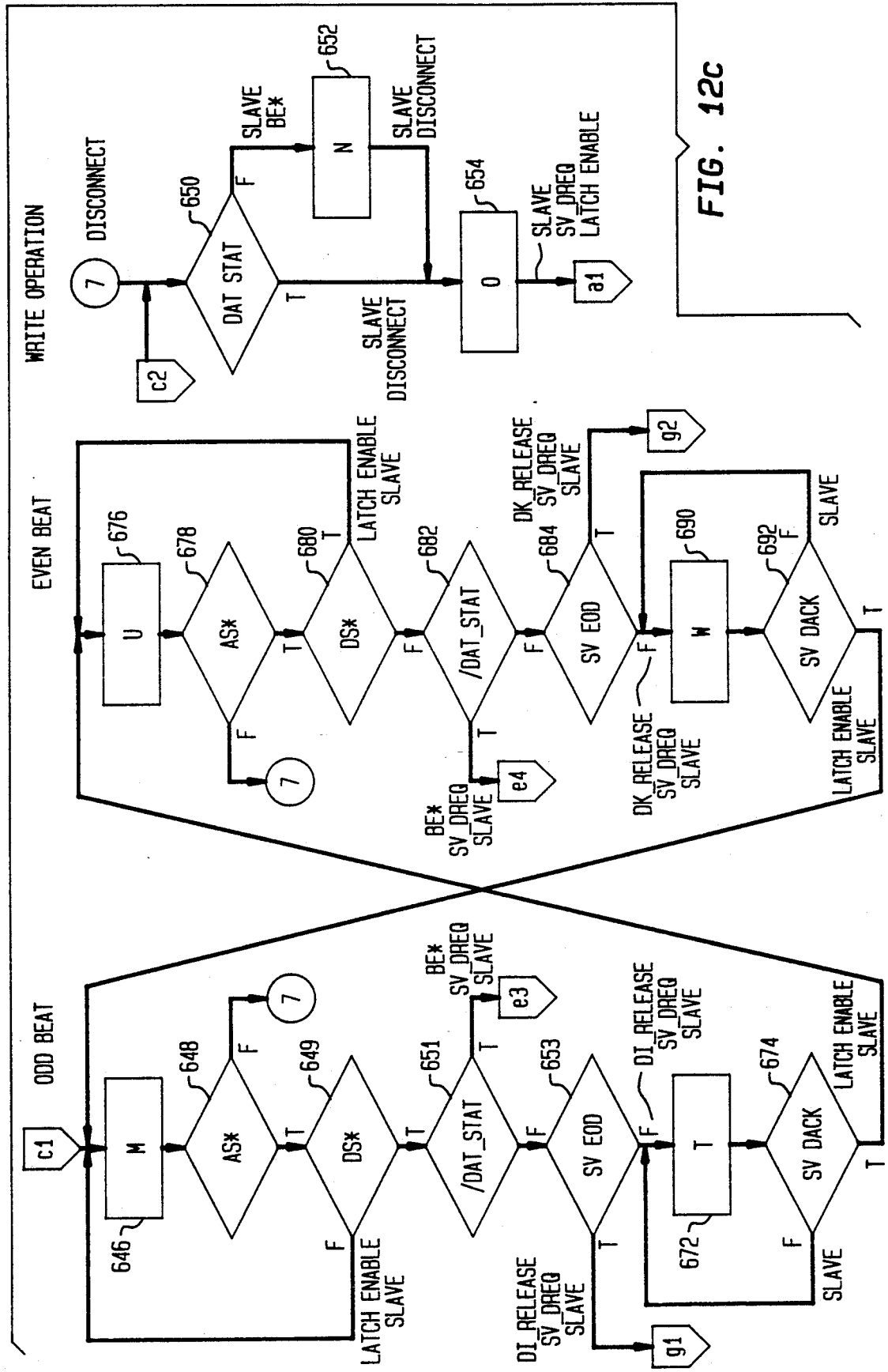
Figure 12D:
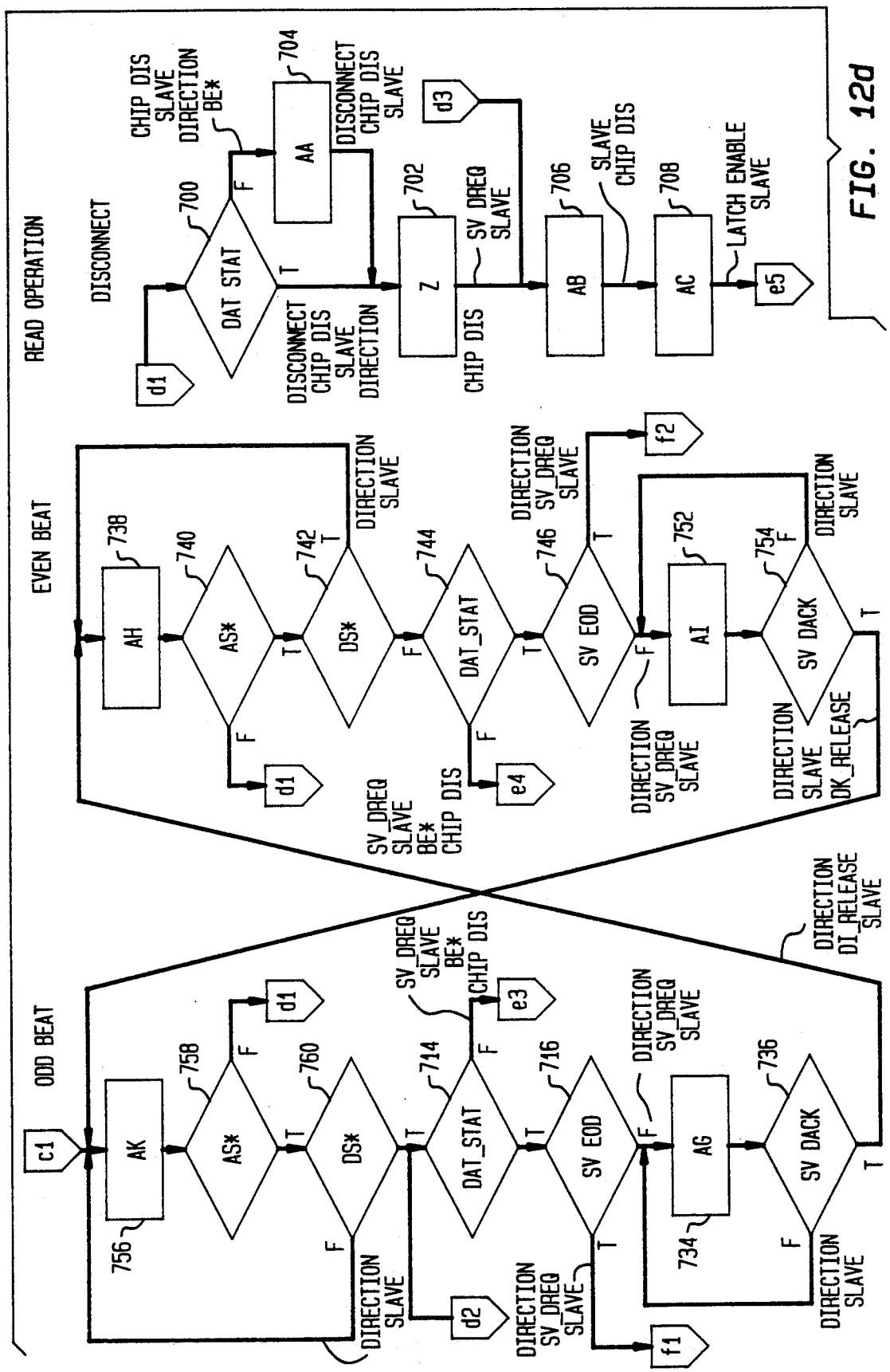
Figure 12E:
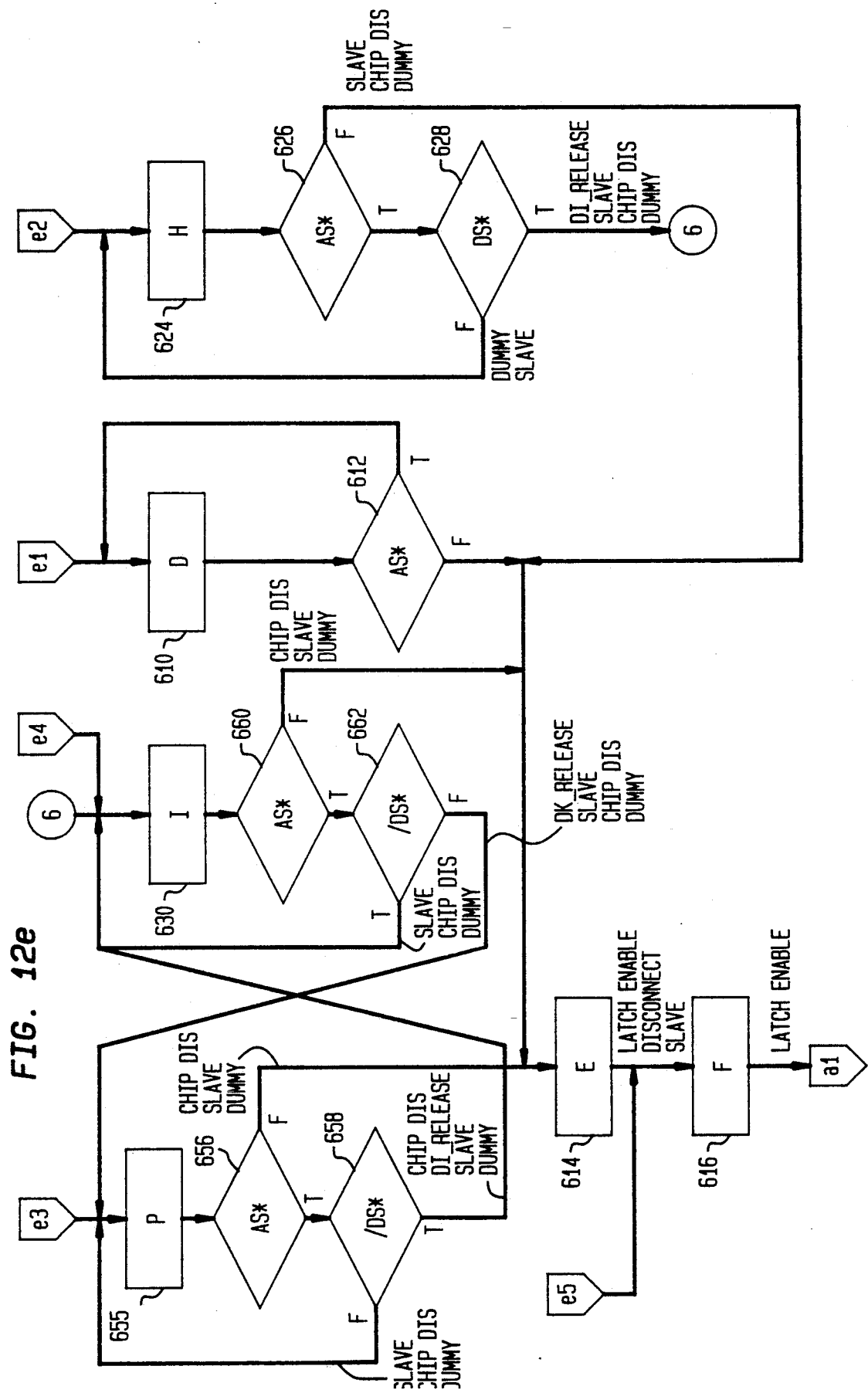

Referring to FIGS. 12*a-g*, the state flow diagrams for the Slave Access Control 28 are shown. Upon reset, control passes to idle state A 600 (FIG. 12*a*). In decision block 601, if the processor 14 or 16 is aligned on the bus 10, then the Do_AIAK signal is generated. In decision block 602, the AS* signal is checked. If asserted then a connection phase has commenced, and the state changes to state B 604. In decision block 606, if there is an address parity error or a command parity error, an error signal, BE* (Futurebus error signal), is asserted and the state changes to state C 608. In this situation neither of the processors 14 or 16 has been selected as a slave. The state then changes to state D 610 (FIG. 12*e*). The Slave Address Latch signal is sent to the processors 14 and 16 and the Connect signal is sent to the AI Control 36 to insure that the connection phase does not continue. The AS* signal is then checked in decision block 612. Once the AS* signal is deasserted by the master after receiving the BE* error signal, the state changes to state E 614. The Latch Enable signal is sent to the data transceivers 15 and a Disconnect signal is sent to the AK Control 38 to disconnect from the bus. The state then changes to state F 616 before changing to the idle state A 600.

Referring to FIG. 12*a*, if there are no address or command errors detected in decision block 606, the command is checked in decision block 618. If the command is one that the processors 14 and 16 cannot handle as a slave (as indicated from the Command Check 46, described above), the Select signals are checked in decision block 620. If either of the Select signal are asserted, then one of the processors 14 or 16 has been selected as a slave. The BE* signal is asserted on the bus 10, the Start signal is sent to the DIDK Control 40, the Slave Address Latch signal is sent to the data transceivers 15, and the Compel signal is sent to the Command Generator 44. The state then changes to wait state G 622. The Connect signal is sent to the AI control 36 and the state changes to state H 624 (FIG. 12*e*). The AS* signal is checked in decision block 626. If not asserted, then the master processor has disconnected from the bus 10. The Chip Disable signal is sent to the data transceivers 15 and the state changes to state E 614. If the AS* signal is still asserted, the DS* signal is checked in decision block 628. If not set, then the Dummy signal is sent to the Master Access Control 24 and the state remains in state H until the DS* signal is deasserted. If the DS* is asserted, then the state was changed to state H 624 during the data transfer phase and the state changes to state I 630 (discussed below).

Referring back to FIG. 12*a*, if the command checked in decision block 618 is one that the processors 14 and 16 can handle as a slave, then the Select signals are checked in decision block 632. If both Select signals are deasserted, then neither of the processors 14 or 16 have been selected as a slave and the state changes to state J 634. The Connect signal is sent to the AI control 36 and the Slave Address Latch signal is sent to the processors 14 and 16. The AS* signal is checked in decision block 636. Once the AS* signal is deasserted, the state is changed back to idle state A 600.

If either of the Select signals are asserted in decision block 632, then one of the processors 14 or 16 has been selected as a slave. In decision block 638, if both Select signals are asserted, then both processors 14 and 16 erroneously determined that they were selected as a slave. The state changes to state K 640. The Connect signal is sent to the AI Control 36, and the Slave Address Latch signal is sent to the processors 14 and 16. The state then changes to state J 634 to wait for the deassertion of the AS* signal.

Write

If only one of the Select signals are asserted in decision block 638, then the Read signal is checked in decision block 642. If the Read signal is not asserted, then a write operation is to be performed, and the Slave Address Latch signal is sent to the selected processor 14 or 16, a Compel signal is sent to the Capability Control 48, and a start signal is sent to the DIDK Control 40. In addition, the SL* signal is sent to the bus 10, which is asserted after the AI* signal has been deasserted to indicate that one of the processors 14 or 16 has recognized the address on the bus 10 as its own. The state then changes to state L 644 (FIG. 12*b*), and the Connect signal is sent to the AI control 36 in order to end the connection phase. The state then changes to state M 646 (FIG. 12*c*). The AS* signal is checked in decision block 648. If deasserted the Data Status signal is checked in decision block 650. If the Data Status signal is asserted, then the Disconnect signal is sent to the AK Control 38 and the state changes to state O 654. If the Data Status signal is deasserted, then the BE* signal is sent to the bus 10 and the state changes to state N 652. Then the Disconnect signal is sent to the AK Control 38 and the state changes to state O 654. The Slave Data Request signal is sent to the slave processor 14 or 16, the Latch Enable signal is sent to the data transceivers 15, and the state changes to idle state A 600.

If the AS* signal is asserted in decision block 648, the DS* signal is checked in decision block 649. Once DS* is asserted by the master, the Data Status signal is checked in decision block 651. If the Data Status signal is deasserted, then the state changes to state P 655 (FIG. 12*e*), and the BE* signal is sent to the bus 10 and a Slave Data Request signal is sent to the slave processor 14 or 16. The AS* signal is checked in decision block 656. If deasserted, the Chip Disable signal is sent to the data transceivers 15, the Dummy signal is sent to the Master Access Control 24, and the state changes from state P to state E 614. Otherwise, the DS* signal is checked in decision block 658. If the DS* signal is asserted, then an ODD beat is still occurring and the Chip Disable signal is sent to the data transceivers 15 and the Dummy signal is sent to the Master Access Control 24, and the state remains in state P 655. Once the DS* signal is deasserted, the Chip Disable signal is sent to the data transceivers 15, the DI__Release signal is sent to the DIDK Control 40, the Dummy signal is sent to the Master Access Control 24 and the state changes to state I 630 for an EVEN data beat error. The AS* signal is again checked in decision block 660. If deasserted, then the Chip Disable signal is sent to the data transceivers 15, the Dummy signal is sent to the Master Access Control 24, and the state changes to state E 614. Otherwise, the DS* signal is checked in decision block 662. Once DS* is asserted, a DK__Release signal is sent to the DIDK Control 40 and the state changes to state P 655 for an ODD data beat error.

Figure 12F:
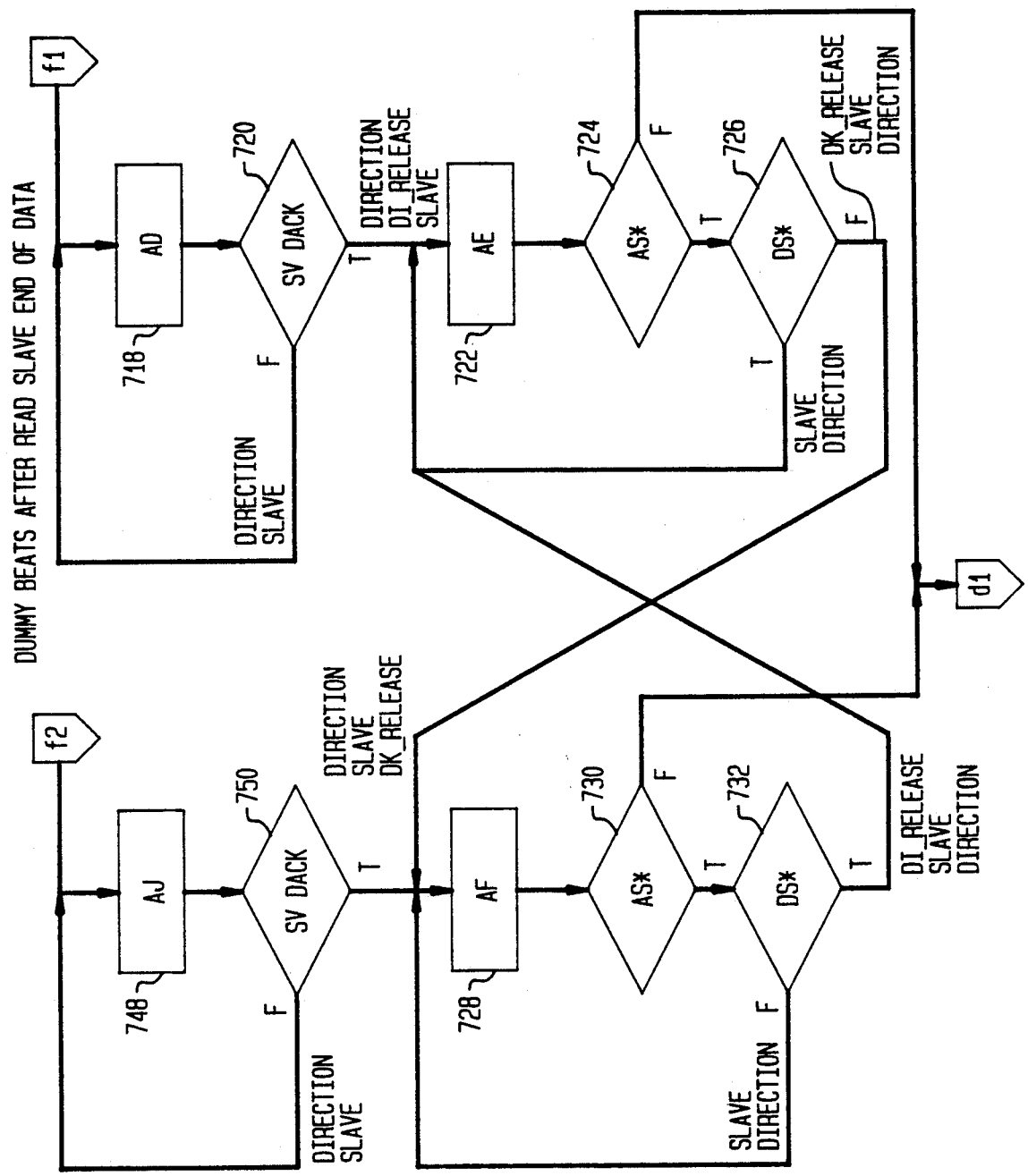
Figure 12G:
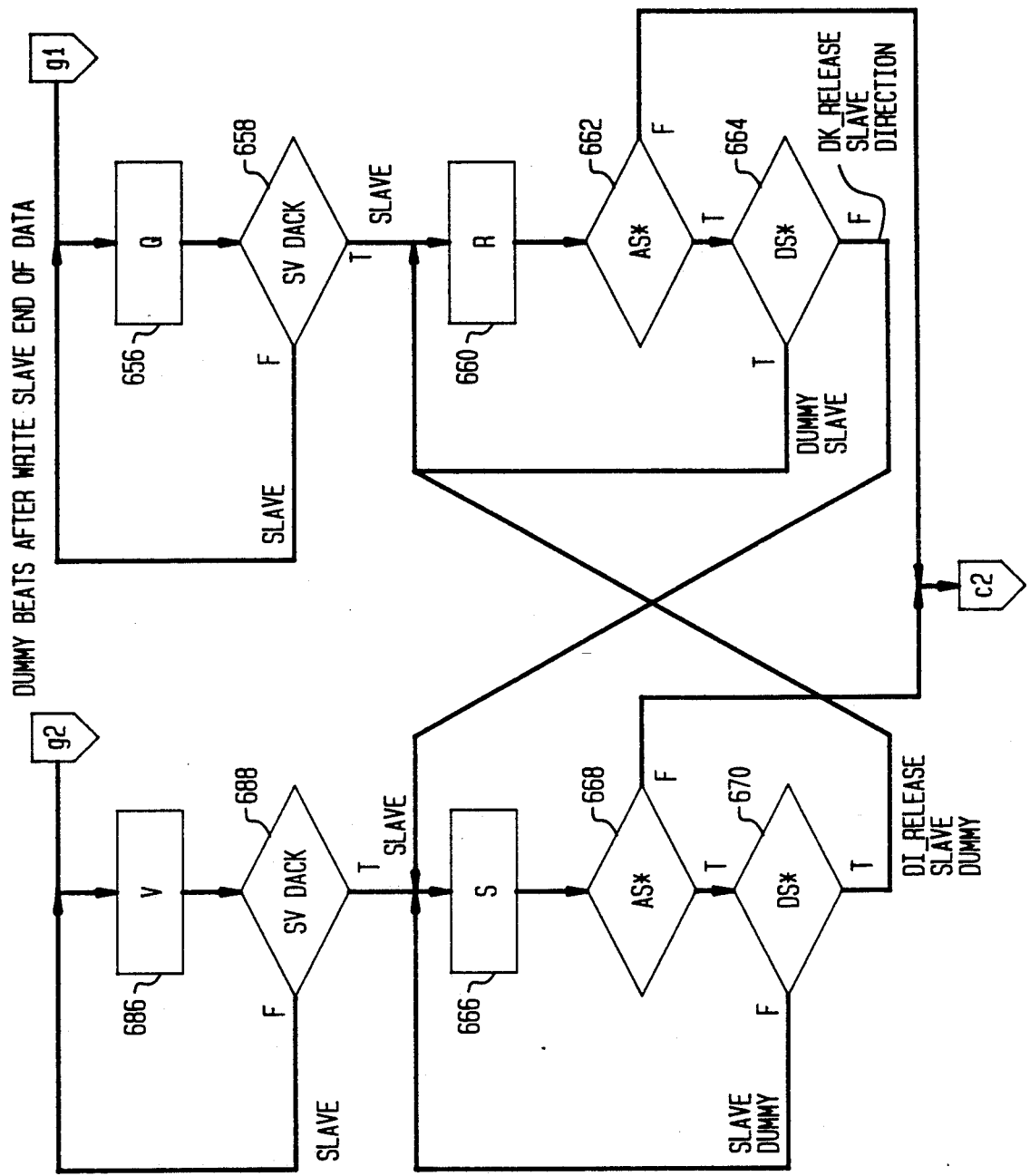

If the Data Status signal is set in decision block 651 (FIG. 12c), then the Slave End-Of-Data signal is checked in decision block 653 If asserted, then the DI-__Release signal is sent to the DIDK Control 40, the Slave Data Request signal is sent to the slave processor 14 or 16, and the state changes to state Q 656 (FIG. 12g). In decision block 658, once the Slave Data Acknowledge signal is received from the slave processor 14 or 16, the state changes to state R 660. The AS* signal is checked in decision block 662. If deasserted, then the Data Status signal is checked in decision block 650 (FIG. 12c). Otherwise, the DS* signal is checked in decision block 664. If asserted, then the data transfer is still in the ODD data beat and the Dummy signal is sent to the Master Access Control 24 and the state remains in state R 660. Otherwise, the DK__release signal is sent to the DIDK Control 40, the Dummy signal is sent to the Master Access Control 24 and the state changes to state S 666 for the EVEN data beat. If the AS* signal is deasserted in decision block 668, then the Data Status signal is checked in decision block 650 (FIG. 12e) for the disconnect phase. Otherwise, the DS* signal is checked in decision block 670. If deasserted, the EVEN data beat is still in process and the Dummy signal is sent to the Master Access Control 24 and the state remains in state S 666. Otherwise, the DI__Release signal is sent to the DIDK Control 40, the Dummy signal is sent to the Master Access Control 24, and the state changes to state R 660 for the ODD data beat.

If the Slave End-Of-Data signal is deasserted in decision block 653, the state changes to state T 672 (FIG. 12c). The Slave Data acknowledge signal is checked in decision block 674. Once asserted, the Latch Enable signal is sent to the data transceivers 15, and the state changes to state U 676 for the EVEN data beat. The AS* signal is checked in decision block 678. If deasserted, the Data Status signal is checked in decision block 650 for the disconnection phase. Otherwise, the DS* signal is checked in decision block 680. Once deasserted, the Data Status signal is checked in decision block 682. If deasserted, the BE* signal is asserted on the bus 10, a Slave Data Request signal is sent to the slave processor 14 or 16, and the state changes to state I 630 for an EVEN data beat error process (FIG. 12e). Otherwise, the Slave End-Of-Data signal is checked in decision block 684. If asserted, then the DK__Release signal is sent to the DIDK Control 40, the Slave Data Request signal is sent to the slave processor 14 or 16, and the state changes to state V 686 (FIG. 12g). In decision block 688, once the Slave Data Acknowledge signal is received from the slave processor 14 or 16, the state changes to state S 666 to continue end-of-data processing.

If the Slave End-Of-Data signal is deasserted in decision block 684 (FIG. 12c), then the DK__Release signal is sent to the DIDK Control 40, the Slave Data Request signal is sent to the slave processor 14 or 16, and the state changes to state W 690. In decision block 692, once the Slave Data Acknowledge signal is asserted by the slave processor 14 or 16, the Latch Enable signal is sent to the data transceivers 15 and the state changes to state_ M 646 for the next ODD data beat.

Read

If the Read signal is asserted in decision block 642 (FIG. 12a), then the Slave Address Latch signal is sent to the slave processor 14 or 16, the Compel signal is generated, the Start signal is sent to the DIDK Control 40, the SL* signal is sent to the bus 10, and the state changes to state X 694. The Connect signal is sent to the AI Control 36, and the state changes to state Y 696. The AS* signal is checked in decision block 698. If deasserted, the Data Status signal is checked in decision block 700 (FIG. 12d) for the disconnection phase. If asserted, then the Disconnect signal is sent to the AK Control 38, the Chip Disable signal is sent to the data transceivers 15, and the state changes to state Z 702. Otherwise, the Chip Disable signal is sent to the data transceivers 15 the BE* signal is sent to the bus 10, and the state changes to state AA 704. Then the Disconnect signal is sent to the AK Control 38 and the state changes to state Z 702. The Slave Data Request signal is sent to the slave processor 14 or 16, and the state changes to wait state AB 706 and wait state AC 708. Then the state changes to state F 616 (FIG. 12e).

If the AS* signal is asserted in decision block 698 (FIG. 12b), then the DS* signal is checked in decision block 710. Once asserted, the Direction and Chip Disable signals are sent to the data transceivers 15, and the state changes to state AL 712. The Data Status signal is checked in decision block 714 (FIG. 12d). If deasserted, the Slave Data Request signal is sent to the slave processor 14 or 16, the Chip Disable signal is sent to the data transceivers 15, the BE* signal is sent to the bus 10, and the state changes to state P 654 (FIG. 12e) for ODD data beat error processing. Otherwise, the Slave End-Of-Data signal is checked in decision block 716. If asserted, the Slave Data Request signal is asserted to the slave processor 14 or 16, and the state changes to state AD 718 (FIG. 12f). In decision block 720, once the Slave Data Acknowledge signal is received from the slave processor 14 or 16, the DI__Release signal is sent to the DIDK Control 40 and the state changes to AE 722. The AS* signal is checked in decision block 724. If deasserted, then the Data Status signal is checked in decision block 700 for disconnect processing (FIG. 12d). Otherwise, the DS* signal is checked in decision block 726. Once deasserted, the DK__Release signal is sent to the DIDK Control 40, and the state changes to state AF 728. The AS* signal is checked in decision block 730. If deasserted, then the Data Status signal is checked in decision block 700 (FIG. 12d) and disconnect processing follows. Otherwise, upon DS* assertion in decision block 732, the DI_Release signal is sent to the DIDK Control 40 and the state changes to state AE 722.

If the Slave End-Of-Data signal is not asserted in decision block 716 (FIG. 12d), then the state changes to state AG 734. In decision block 736, once the Slave Data Acknowledge signal is received from the slave processor 14 or 16, then the state changes to state AH 738 for the EVEN data beat. The AS* signal is checked in decision block 740. If deasserted, then the Data Status signal is checked in decision block 700 (FIG. 12d) and disconnect processing follows. Otherwise, the DS* signal is checked in decision block 742. Once deasserted, the Data Status signal is checked in decision block 744. If the Data Status signal is deasserted, then the Slave Data Request signal is sent to the slave processor 14 or 16, the Chip Disable signal is sent to the data transceivers 15, the BE* signal is sent to the bus 10, and the state changes to state I 630 (FIG. 12e) for EVEN data beat error processing. If the Data status signal is asserted, then the Slave End-Of-Data signal is checked in decision block 746. If asserted, then the Slave Data Request signal is sent to the slave processor 14 or 16, the Chip Disable signal is sent to the bus transceivers 15 and the state changes to state AJ 748 (FIG. 12f) for EVEN data beat end-of-data processing. In decision block 750, once the Slave Data Acknowledge signal is received from the slave processor, the DK_Release signal is sent to the DIDK Control 40 and the state changes to state AF 728. If the Slave End-Of-Data signal is not asserted in decision block 746 (FIG. 12d), then a Slave Data Request signal is sent to the slave processor 14 or 16 and the state changes to state AI 752. In decision block 754, once the Slave Data Acknowledge signal is asserted by the slave processor 14 or 16, the DK_Release signal is sent to the DIDK Control 40 and the state changes to AK 756 for the next ODD data beat. The AS* signal is checked in decision block 758, if deasserted, the Data Status signal is checked in decision block 700 for disconnect processing (FIG. 12d). If the AS* signal is asserted, then the DS* signal is checked in decision block 760. Once asserted, the ODD data beat processing continues in decision block 714 where the Data Status signal is checked. Eventually, the Slave End-of-Data signal is asserted which causes Dummy signals to be generated (FIG. 12f) and disconnection processing (FIG. 12d).

Figure 14:
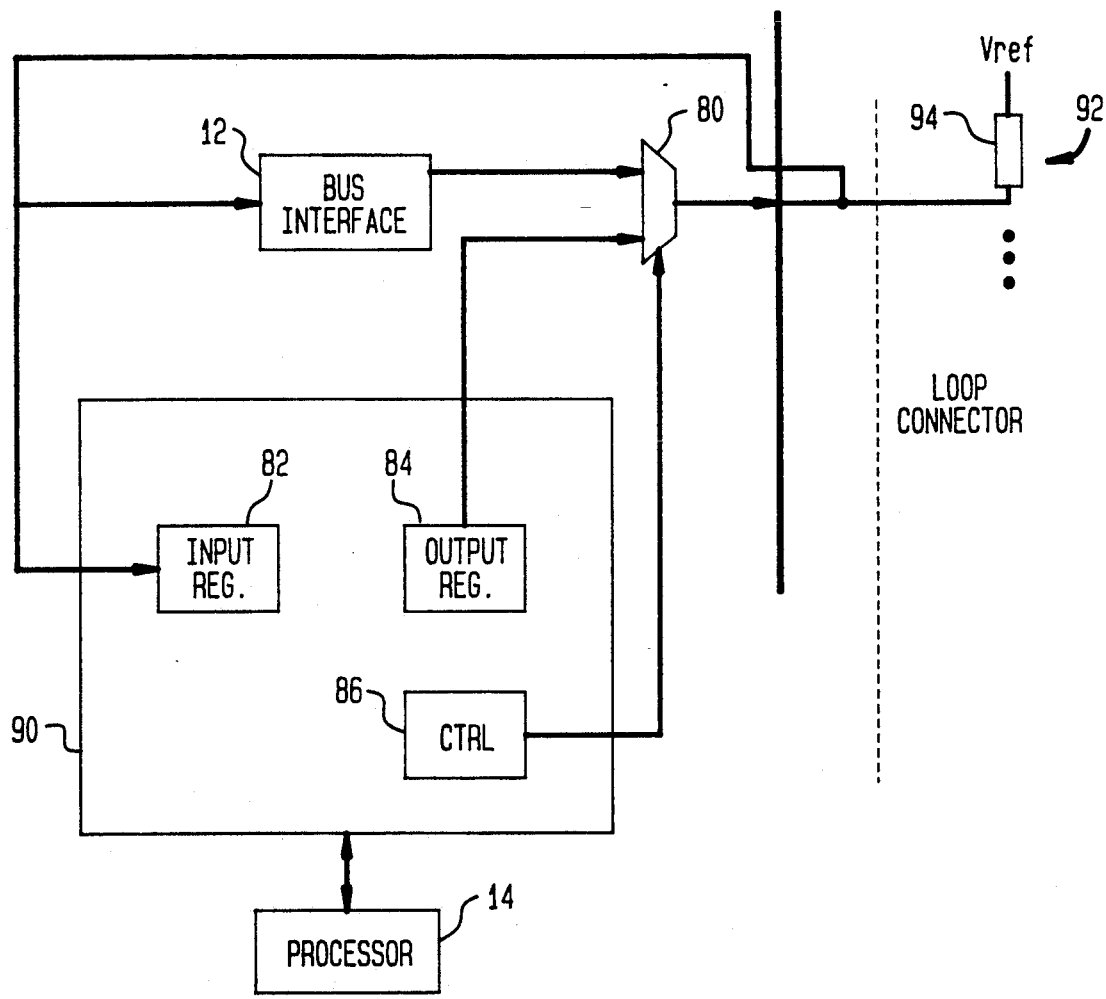
FIG. 14 is a block diagram of a testing circuit for the bus interface of the present invention.

Referring to FIG. 14 a testing circuit for the bus interface 12 of the present invention is shown. All signal lines of the bus interface 12 that are asserted on the bus 10 are coupled to first inputs of a series of multiplexers 80. The second inputs of the multiplexers 80 are coupled to a register circuit 90. This register circuit 90 comprises a series of input registers 82 and output registers 84, as well as a control circuit 86 which is coupled to the control inputs of the multiplexers 80. During normal operation of the bus interface 12, the control circuit 86 selects the first inputs of the multiplexers 80, thus coupling the output signal lines of the bus interface 12 to the bus 10. The output signal lines of the multiplexers 80 are coupled to a loopback connector 92 which includes a plurality of terminating resistors (only one of which is shown as reference number 94). The terminating resistors are tied to a positive voltage source $V_{REF}$ to provide pull-ups to open collector-type bus transceivers coupled to the bus 10 (not shown). The loopback connector 92 couples together bus signals in groups of two or more. This enables complete testing of signal paths by asserting a signal via one transceiver and checking its logic level via another.

During a testing mode of operation, the input signals from the bus 10 (specifically, the loopback connector 92) are supplied to the bus interface 12 (as described above) and the input registers 82. The input registers 82 include a sufficient number of storage locations to store all of the input signals of the bus interface 12. The output registers 84 supply the same bus signals that are supplied by the bus interface 12. The output registers 84 also include sufficient storage for all of the bus signals that are supplied by the bus interface 12. The contents of the output registers 84 can be controlled by an external device such as processor 14 (described above). In operation, the processor 14 and the register circuit 90 can detect short or open circuit conditions in all of inputs and outputs from and to the bus 10. For instance, after bus signals are asserted onto the bus 10 via the output registers 84, these same signals can be sampled and stored in the input registers 82 to ensure that they have been properly asserted. Alternatively, the register circuit 90 can be used to check the operation of the bus interface 12, as well as initializing and configuring the bus interface 12. Finally, the register circuit 90 and multiplexers 80 can be used to implement the bus protocol, described above, by the processor 14 without using the bus interface 12. Applications of this feature include self tests and fault diagnosis when a fault condition arises in the bus interface 12.

What is claimed is:

1. An interface controller adapted to be coupled between an asynchronous bus and at least one processor, the asynchronous bus including address/data lines and handshaking signal lines and operating according to a bus protocol including a plurality of phases with handshaking signals on the handshaking signal lines to control transitioning of phases on the asynchronous bus, the interface controller comprising:
   a plurality of asynchronous state machines coupled to said bus, each of the asynchronous state machines operating to detect, generate, and transmit handshaking signals on the handshaking signal lines of the asynchronous bus during certain ones of the phases;
   a plurality of synchronous state machines coupled between said processors and said asynchronous state machines, said synchronous state machines controlling the operating of said asynchronous state machines; and
   a transceiver coupled to at least one of the asynchronous state machines and adapted to be coupled to each of the address/data lines of the asynchronous bus and the processor, such that said transceiver can receive and transmit address and data information between the processor and the address/data lines of the asynchronous bus under the control of at least one asynchronous state machine.

2. The interface controller of claim 1, wherein said processor is one of a master device and a slave device.

3. In a computer system having an asynchronous bus and a master device and a slave device coupled to one another by the asynchronous bus, the asynchronous bus operating according to a predetermined protocol where handshaking signals are passed between said master device and said slave device, the protocol including a plurality of phases:

1) a connection phase where said master selects and establishes an asynchronous bus connection between the master and a desired slave;
2) a data transfer phase where data is transferred between said master and said desired slave; and
3) a disconnection phase where the master terminates transfer of data between the master and desired slave and breaks said asynchronous bus connection;

the computer system further comprising an interface controller coupled to the asynchronous bus, said asynchronous bus controller comprising a plurality of asynchronous state machines coupled to said asynchronous bus and a plurality of synchronous state machines, each of said plurality of synchronous state machines being coupled to at least one of said asynchronous state machines, said plurality of synchronous state machines being coupled to one of said master and slave devices, each of said asynchronous state machines operating to detect, receive, and generate the handshaking signals of the bus protocol, said synchronous state machines controlling the operating of said asynchronous state machines.

4. The computer system of claim 3, wherein said interface controller is coupled between the asynchronous bus and the master device.

5. The computer system of claim 3, wherein said interface controller is coupled between the asynchronous bus and the slave device.

6. The computer system of claim 3, wherein said interface is adapted to be coupled between the asynchronous controller and one of said master device and said slave device, wherein said master device asserts a plurality of signals:

an address synchronization signal indicating that addressing information placed on the asynchronous bus is valid, said address synchronization signal indicating the beginning of the connection phase; and a data synchronization signal indicating data information placed on the asynchronous bus is valid, in the case of said master writing data to said slave, and said data synchronization signal indicating a request by the master for more data from the slave, in the case of said master reading data from said slave;

said slave device asserts a plurality of signals:

address acknowledge signals indicating the receipt of address information by the slave from the master, said address acknowledge signals indicating the completion of said connection and disconnection phases; and data acknowledge signals indicating the receipt of data information by the slave from the master, in the case of said master writing data to said slave, said data acknowledge signals indicating that data information from the slave is valid on the asynchronous bus, in the case of said master reading data from said slave.

7. The computer system of claim 6, wherein said plurality of asynchronous state machines comprises:
a data synchronization controller asserting said data synchronization signal;
first and second address acknowledge controllers asserting said address acknowledge signals; and
a data acknowledge controller asserting said data acknowledge signals.

8. The computer system of claim 7, wherein said plurality of synchronous state machines comprises:

a master access controller coupled to said data synchronization controller, said master access controller asserting said address synchronization signal and sending a first control signal to said data synchronization controller when data information placed on the asynchronous bus is valid, in the case of said master writing data to said slave, and when said master requests more data from the slave, in the case of said master reading data from said slave, such that said data synchronization controller asserts said data synchronization signal in dependance on said first control signal; and a slave access controller coupled to said data acknowledge controller and said first and second address acknowledge controllers, said slave access controller sending a second control signal to said first address acknowledge controller when a slave device has received address information from the master device, such that said address acknowledge controller asserts one of said address acknowledge signals in dependance on said second control signal, said slave access controller sending a third control signal to said second address acknowledge controller when said disconnection phase begins, such that said second address acknowledge controller asserts one of said address acknowledge signals in dependance on said third control signal, and said slave access controller sending a fourth control signal to said data acknowledge controller when data information is received by the slave from the master, in the case of said master writing data to said slave, and when data information from the slave is valid on the asynchronous bus, in the case of said master reading data from said slave, such that said data acknowledge controller asserts said data acknowledge signals in dependance on said fourth control signal.

9. The computer system of claim 8 further comprising first and second delay devices each having an input and an output, said inputs coupled to said data acknowledge signal lines on said asynchronous bus said outputs coupled to said data synchronization controller, such that said data synchronization controller asserts said data synchronization signal in response to said first control signal and said data acknowledge signals from said first and second delay devices.

10. The computer system of claim 8, wherein said first address acknowledge controller asserts said address acknowledge signal in dependance on said second control signal and said address synchronization signal.

11. The computer system of claim 8, wherein said second address acknowledge controller asserts said address acknowledge signal in dependance on said third control signal and said address synchronization signal.

12. The computer system of claim 8, wherein said data acknowledge controller asserts said data acknowledge signals in dependance on said fourth control signal and said data synchronization signal.

13. The computer system of claim 8, wherein said asynchronous bus includes address/data lines, said computer system further comprising:

a transceiver adapted to be coupled to each of the address/data lines of the asynchronous bus and one of said master and slave devices, said transceiver having a plurality of control inputs, said transceiver can receive and transmit address and data information between one of said devices and the address/data lines of the asynchronous bus.

14. The computer system of claim 13, wherein said plurality of asynchronous state machines further comprises:
a clock controller coupled to a first control input of said transceiver, said clock controller asserting a clock signal, such that said transceiver transmits information from said device to said asynchronous bus.

15. The computer system of claim 14, wherein said master access controller sends a first enabling signal to said clock controller, and said clock controller asserts said clock signal in dependance on said first enabling signal and said data acknowledge signals.

16. The computer system of claim 15, wherein said interface controller is coupled between a master device and the asynchronous bus, in the case of said master device writing data to a slave device coupled to the asynchronous bus, said clock controller asserting said clock signal after said data acknowledge signal is received from said slave device.

17. The computer system of claim 13, wherein said plurality of asynchronous state machines further comprises:
a latch enable controller coupled to a second controller input of said transceiver, said latch enable control asserting a latch signal, such that said transceiver transmits information from said bus to said device in dependance on said latch signal.

18. The computer system of claim 17, wherein said master access controller sends a second enabling signal to said latch enable controller, such that said latch enable controller asserts said latch signal in dependance on said second enable signal and said data acknowledge signals.

19. The computer system of claim 18, wherein said interface controller is coupled between a master device and the asynchronous bus, in the case of said master device reading data from a slave device coupled to the asynchronous bus, said latch enable controller asserting said latch enable signal after said data acknowledge signal is received from said slave device.

20. The computer system of claim 3, further comprising:
a series of multiplexers, each having a first input, a second input, an output, and a control input, such that a binary signal supplied to said control input selectively couples one of said first and second inputs to said output, said outputs of said multiplexers being coupled to said asynchronous bus;
a series of input registers having a plurality of storage locations, said series of input registers being coupled to said asynchronous bus and storing said handshaking signals from said asynchronous bus;
a series of output registers having a plurality of storage locations, said series of output registers being coupled to the second inputs of said series of multiplexers, and supplying said handshaking signals for said asynchronous bus; and
a control circuit coupled to the control inputs of said series of multiplexers, such that said control circuit selectively couples one of said bus interface and said output registers to said asynchronous bus.

21. The computer system of claim 20, further comprising:
a processor coupled to said input registers, said output registers, and said control circuit, said processor supplying handshaking signals for said output registers and controlling said control circuit.

* * * * *